United States Patent
Masuhiro et al.

(10) Patent No.: US 8,462,767 B2
(45) Date of Patent: *Jun. 11, 2013

(54) INTERNET PROTOCOL COMPLIANT PRIVATE BRANCH ELECTRONIC EXCHANGE AND A METHOD FOR REDUNDANTLY CONFIGURING TERMINAL INTERFACES

(75) Inventors: Mao Masuhiro, Tokyo (JP); Yasuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1251 days.

This patent is subject to a terminal disclaimer.

(21) Appl. No.: 12/132,225

(22) Filed: Jun. 3, 2008

(65) Prior Publication Data

US 2008/0232356 A1  Sep. 25, 2008

Related U.S. Application Data

(62) Division of application No. 10/419,766, filed on Apr. 22, 2003, now Pat. No. 7,440,566.

(30) Foreign Application Priority Data

Apr. 25, 2002 (JP) .................................. 2002-123345

(51) Int. Cl.
*H04L 12/66* (2006.01)
*H04L 12/16* (2006.01)
*H04L 12/28* (2006.01)
*H04L 12/56* (2006.01)
*H04Q 11/00* (2006.01)

(52) U.S. Cl.
USPC ........... 370/352; 370/259; 370/260; 370/261; 370/401

(58) Field of Classification Search
USPC .................. 370/352, 259, 260, 261, 262, 401
See application file for complete search history.

(56) References Cited

U.S. PATENT DOCUMENTS

| 6,404,746 | B1 | 6/2002 | Cave et al. | |
|---|---|---|---|---|
| 6,898,188 | B1 | 5/2005 | Hamami | |
| 7,035,252 | B2 | 4/2006 | Cave et al. | |
| 7,254,832 | B1 | 8/2007 | Christie | |
| 2002/0027983 | A1* | 3/2002 | Suzuki | ........................... 379/229 |
| 2003/0095542 | A1* | 5/2003 | Chang et al. | .................. 370/352 |
| 2003/0128696 | A1 | 7/2003 | Wengrovitz et al. | |

\* cited by examiner

*Primary Examiner* — Asad Nawaz
*Assistant Examiner* — Stephanie Chang
(74) *Attorney, Agent, or Firm* — Young & Thompson

(57) ABSTRACT

The IP-PBX includes a multimedia gateway controller in which a call control data master table stores call control data for all terminals falling under the control of the IP-PBX. In the event of failure of a PH accommodating IP phones and the like via the LAN, the multimedia gateway controller transfers the contents of the call control data slave table existing on the PH to the call control data slave table on another PH.

11 Claims, 13 Drawing Sheets

INTERNET PROTOCOL COMPLIANT PRIVATE BRANCH ELECTRONIC EXCHANGE AND A METHOD FOR REDUNDANTLY CONFIGURING TERMINAL INTERFACES

BACKGROUND OF THE INVENTION

1. Field of the Invention

The present invention relates to an Internet Protocol compliant private branch electronic exchange and a method for redundantly configuring terminal interfaces and its program. In particular, the invention relates to a redundant configuration of terminal interfaces which interface with terminals falling under the control of the Internet compliant private branch electronic exchange.

2. Description of the Related Art

In a prior art Internet Protocol compliant private branch electronic exchange [hereinafter referred to as "IP-PBX" (Internet Protocol-Private Branch exchange)], a Multimedia Gateway Controller (MGC) that performs call-control-processing tasks has Local Area Network (LAN) ports and connects these ports to the Internet, an intranet, or a LAN. In this case, the LAN is a network that may be Ethernet (registered trademark).

Using the MGC, the IP-PBX conducts control of Internet Protocol (IP) compliant phones (hereinafter referred to as "IP phones") that may connect to the Internet or an intranet and a terminal adapter [hereinafter referred to as IPTA (Internet Protocol Terminal Adapter)] which accommodates terminals not compliant with IP and attaches IP to the terminals.

In the IP-PBX, a redundant configuration of terminal interfaces when connecting to a LAN that accommodates IP phones is accomplished by applying a Virtual Router Redundancy Protocol (VRRP) which is performed on a router. This method is referred to as a first method.

A redundant configuration of the terminal interfaces is also practiced in such a manner that the IP addresses of two interfaces to which an IP phone may connect are given to the IP phone and a procedure is performed in which the IP phone inquires which of the two interfaces identified by the respective IP addresses controls it. This method is referred to as a second method.

First, the first method will now be explained with reference to FIG. 12. In FIG. 12, the IP-PBX 60 includes an MGC 61 and the MGC 61 has a memory 63 connecting to a main processor (MP) 62 and a call control data master table 631 created in the memory 63.

The main processor 62 connects to a LAN interface 64-1 through a system bus 400 and the LAN interface 64-1 connects to a switching hub 5-1 via a LAN 200. The switching hub 5-1 connects to a network [for example, a Wide Area Network (WAN) 300] through a router 6.

On the other hand, IP phones 7-1, 7-2 or an IPTA 8 that accommodates non-IP phones 9-1, 9-2 connects to a switching hub 5-3 and the switching hub 5-3 connects to the network via the router 6. By these connections, the MGC 61 is bound to be able to conduct call control for the IP phones 7-1, 7-2 or non-IP phones 9-1, 9-2 accommodated by the IPTA 8. A LAN interface 64-2 is a duplicate of the LAN interface 64-1 in a redundant configuration and the LAN interface 64-2 and the LAN interface 64-1 are assigned the same IP address.

The main processor 62 of the MGC 61 generates IP packets in a packet format of Transmission Control Protocol/Internet Protocol (TCP/IP) or User Datagram Protocol (UDP) and the LAN interface 64-1 transmits the IP packets. On the other hand, IP packets from the terminals being under the control of the IP-PBX, such as the IP phone 7-1, are received by the LAN interface 64-1, and the main processor 62 extracts call control data from the IP packets.

In the above configuration, the LAN interface 64-1 operates as a master and a VRRP procedure is effected between the LAN interface 64-1 and the LAN interface 64-2. The LAN interface 64-1 gives interface data to the LAN interface 64-2. Both the LAN interface 64-1 and the LAN interface 64-2 are virtually recognized by the IP phones 7-1, 7-2, IPTA 8, and switching hub 5-1 as one interface with one IP address. That is, when the LAN interface 64-1 is operating, the LAN interface 64-2 is on standby and does not access the LA 200. Thus, an access point from the terminals is one IP address for the LAN interfaces 64-1, 64-2.

In this connection, if the LAN interface 64-1 has failed, the LAN interface 64-2 is put into operation, according to the VRRP procedure, so that the ongoing call control procedure can continue. In that event, the IP address as the access point from the terminals remains unchanged. During the operation of the LAN interface 64-2, when the LAN interface 64-1 has recovered from the failure, the LAN interface 64-2 returns to the standby state.

Then, the second method will be explained with reference to FIG. 13. Although the same configuration as for the above-described first method is shown in FIG. 13, the second method differs from the first method in that the VRRP procedure is not performed and the LAN interface 64-2 and LAN interface 64-1 are assigned different IP addresses.

In the above configuration, for example, on the IP phone 7-1, as the LAN interfaces to which it is to connect, initially, the LAN interface 64-1 is set for the master and the LAN interface 64-2 for the slave. Two IP addresses: IP address A of the LAN interface 64-1 and IP address B of the LAN interface 64-2 are stored in the memory of the IP phone.

The IP phone 7-1 periodically verifies the proper performance of the LAN interface 64-1, using a PING packet or the like. As long as the LAN interface 64-1 continues to operate properly, call control packets from the IP phone 7-1 are sent to the LAN interface 64-1.

Meanwhile, in the event that the IP phone 7-1 cannot verify the proper performance of the LAN interface 64-1, the initial setting changes; the LAN interface 64-2 becomes the master and the LAN interface 64-1 becomes the slave. Then, the phone 7-1 periodically verifies the proper performance of the LAN interface 64-2, using the PING packet or the like. As long as the LAN interface 64-2 continues to operate properly, call control packets from the IP phone 71 are sent to the LAN interface 64-2.

In the foregoing prior art redundant configuration of terminal interfaces, where the first method or the second method is applied, pairs of LAN interfaces must be installed as the terminal interfaces.

The similar redundant configuration is applied to routers and the number of the routers on the network is limited. By contrast, the number of terminal interfaces or LAN interfaces of the IP-PBX must be increased with increase in the number of terminals accommodated by the IP-PBX. Accordingly, such a problem is posed when the forgoing prior art methods apply to the terminal interfaces that the total cost required is the number of LAN interfaces×the cost of a LAN interface×2 (duplication); that is, the cost is double the cost of installing the LAN interfaces dispensing with the redundant configuration.

A problem associated with the second prior art method for redundantly configuring terminal interfaces is as follows. This method realizes a redundant configuration of terminal interfaces that can be recognized from the viewpoint of the terminals falling under the control of the IP-PBX, such as IP phones and IPTAs that are accommodated by the IP-PBX. LAN interface changeover is not performed upon failure detection by the MGC and the LAN interfaces. Each of the above terminals verifies proper interface performance and changes the LAN interface selected when it detects the failure of the interface performance. For verifying proper interface performance, packets must be sent and received between the interface and the terminal and, consequently, the packet traffic over the network increases.

In short, the problem with the second method is an increase in the packet traffic over the LAN due to that a plurality of IP phones which are verifying the performance of the LAN interface to which they are connecting, decreases LAN performance. Interface duplications for redundancy by the second method, that is, LAN interfaces must always be installed in pairs and, accordingly, the cost increases. The cost increase would be serious when the number of terminals accommodated by the IP-PBX expands and it is necessary to expand the number of LAN interfaces. Also, a great number of IP addresses to be assigned to the LAN interfaces must be employed. A congestion problem may occur, for example, when the number of terminals accommodated by the IP-PBX reaches several thousands and over and call origination attempts from the terminals are congested. That is, the origination attempts may become hard for the LAN interfaces to serve (in call procedures for processing them).

Furthermore, another problem may be presented when a failure has occurred in the network, for example, a router fault or wiring fault between the LAN interfaces and the terminals falling under the control of the IP-PBX. In that event, the packets for verifying proper interface performance from the terminals cannot be sent and received therebetween and, consequently, the terminals change over the LAN interface to which they connect.

Also, another drawback of the second method is employing an exceedingly great number of IP addresses for the LAN interfaces because the IP addresses must be assigned to all the LAN interfaces, whether they are operating or on standby.

SUMMARY OF THE INVENTION

An object of the present invention is to provide an Internet Protocol compliant private branch electronic exchange which constructs with low costs flexible redundant configurations of terminal interfaces accommodating IP phones and the like via a LAN in an IP-PBX.

To this end, an Internet Protocol compliant private branch electronic exchange, includes
a call control data master table which is provided on a multimedia gateway controller performing call-control-processing tasks and retains call control data for the terminals falling under the control of the exchange;
a plurality of terminal interfaces connected to either a system bus or an expansion system bus of said multimedia gateway controller;
call control data slave tables which are provided respectively on each of said plurality of terminal interfaces and retain the copy of a portion of said call control data master table; and
a unit for copying the call control data for the terminals controlled by a terminal interface, which has failed to perform procedures for call control for, at least, the terminals falling under its control during operation, from said call control data master table to the call control data slave table on another terminal interface.

Advantageously, this redundant configuration of terminal interfaces can be constructed flexibly and with low costs.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENT

An Internet Protocol compliant private branch electronic exchange embodying the present invention will be described with reference to FIG. 1 through FIG. 11.

Figure 1:
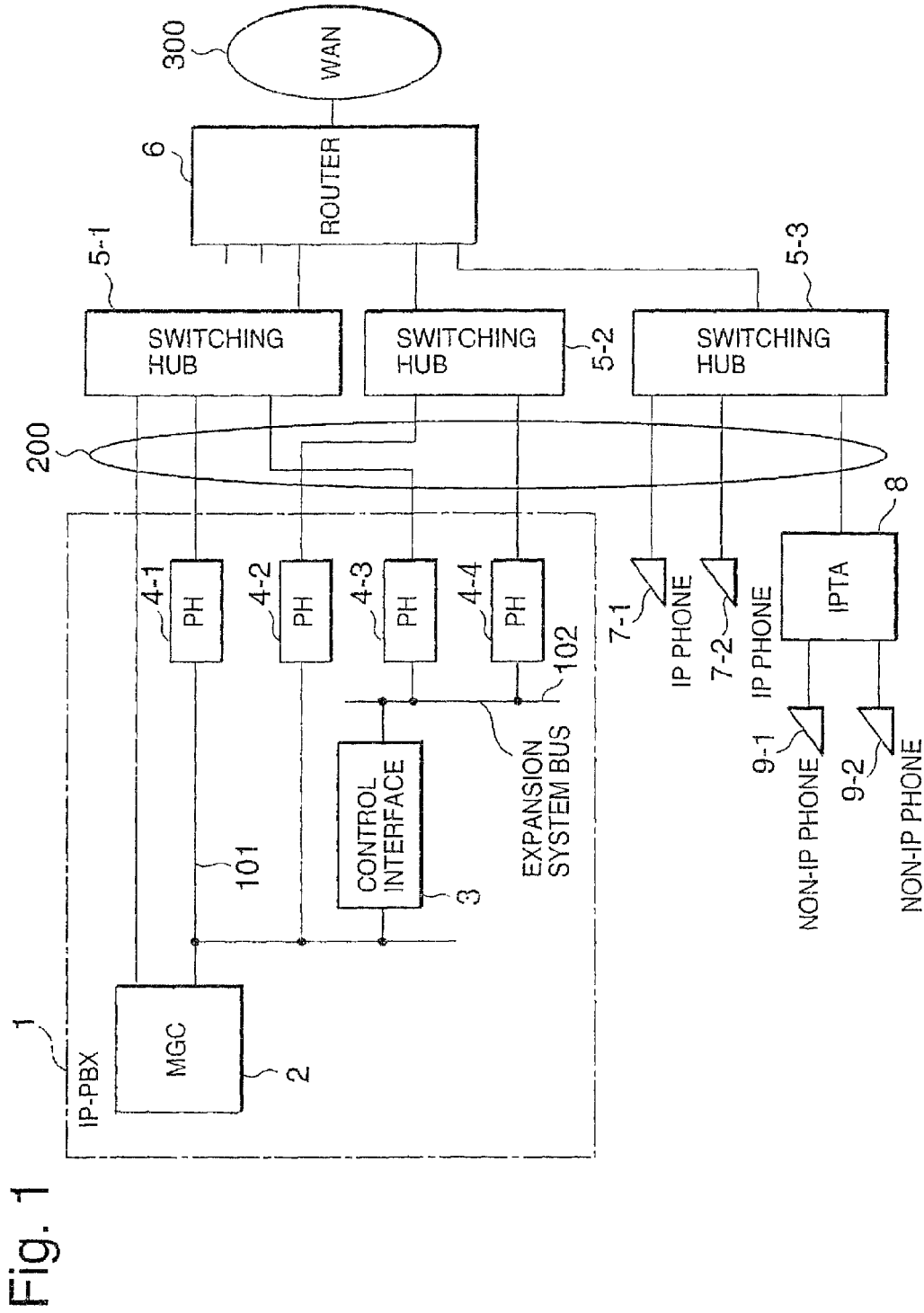
FIG. 1 is a block diagram showing an IP-PBX system configuration according to a first preferred embodiment of the present invention.

FIG. 1 is a block diagram showing a system configuration of an IP-PBX (Internet Protocol-Private Branch exchange) according to a first preferred embodiment of the present invention. In FIG. 1, the IP-PBX 1 is comprised of a Multimedia Gateway Controller (MGC) 2, a control interface 3, Protocol Handlers (PHs) 4-1 through 4-4, a system bus 101, and an expansion system bus 102.

The MGC 2 performs call-control-processing tasks for switching control by the IP-PBX 1 and the control interface 3 or the PHs 4-1, 4-2 are connected to it through the system bus 101. The control interface 3 expands the system bus 101 of the MGC 2 and the PHs 4-3, 4-4 are connected to it through the expansion system bus 102.

The PHs 4-1 through 4-4 are terminal interfaces that carry out protocol-control-processing tasks including protocol conversion processing and the like for the call control and processing by the MGC 2 and connect to switching hubs 5-1, 5-2 via a LAN 200. The switching hubs 5-1, 5-2 connect to a network [for example, a Wide Area Network (WAN) 300] via a router 6. The LAN 200 is a network that may be Ethernet (registered trademark).

On the other hand, IP compliant phones (hereinafter referred to as "IP phones") 7-1, 7-2 or an IP compliant terminal adapter [hereinafter referred to as "IPTA" (Internet Protocol Terminal Adapter)] 8 that accommodates non-IP phones 9-1, 9-2 connects to a switching hub 5-3 and the switching hub 5-3 connects to the network (for example, WAN 300) via the router 6.

By these connections, the MGC 2 is bound to be able to conduct call control for the IP phones 7-1, 7-2 or non-IP phones 9-1, 9-2 accommodated by the IPTA 8. In FIG. 1, a network including the switching hubs 5-1 to 5-3 and the router 6 is simplified.

Figure 2:
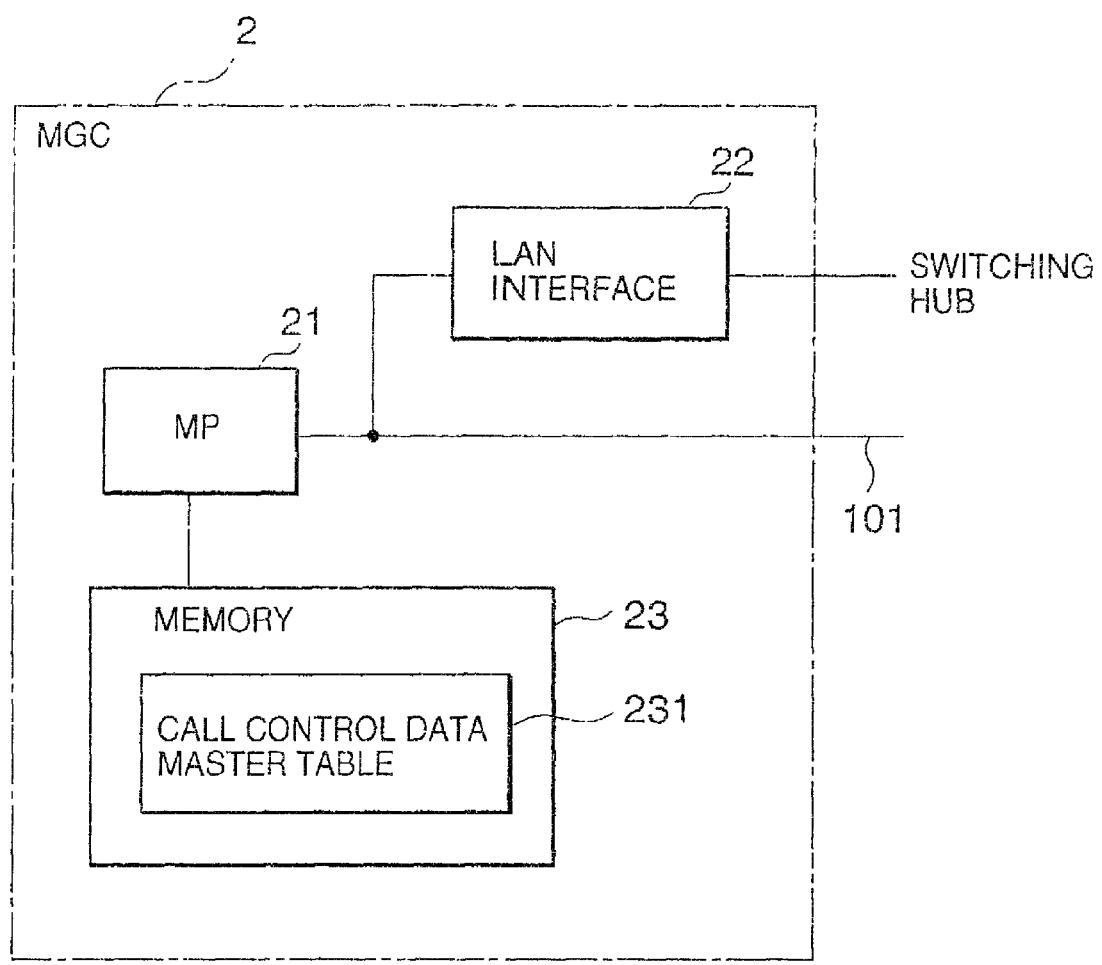
FIG. 2 is a block diagram showing a configuration of an MGC shown in FIG. 1.

FIG. 2 is a block diagram showing a configuration of the MGC 2 shown in FIG. 1. In FIG. 2, the MGC 2 is comprised of a main processor (MP) 21, a LAN (Local Area Network) interface 22, and a memory 23 connecting to the main processor 21 and a call control data master table 231 is created in the memory 23.

Figure 3:
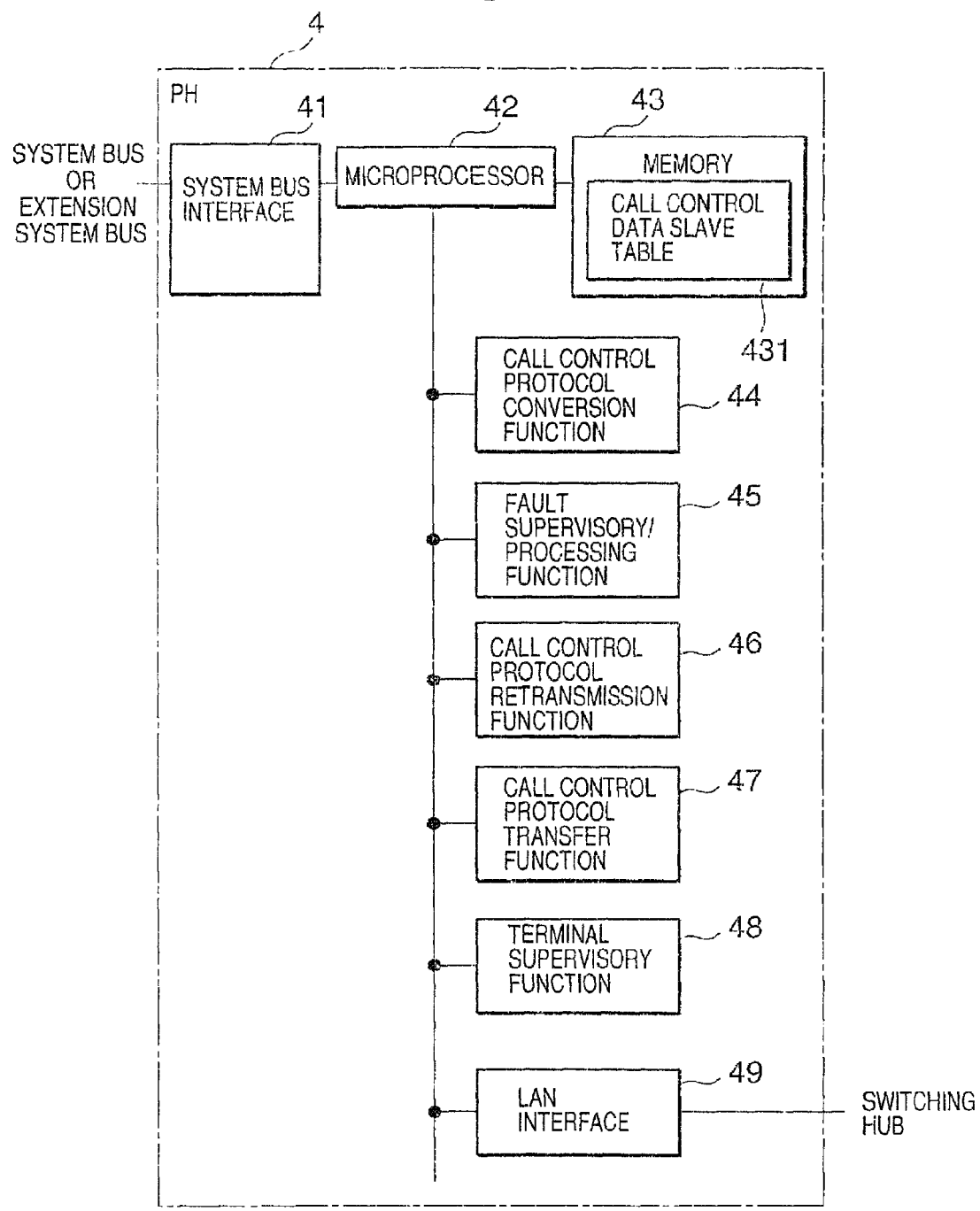
FIG. 3 is a block diagram showing a configuration of a PH shown in FIG. 1.

FIG. 3 is a block diagram showing a configuration of one of the PHs 4-1 through 4-4 shown in FIG. 1. In FIG. 3, a PH 4 is comprised of a system bus interface 41, a microprocessor 42, a memory 43, a call control protocol conversion function 44, a fault supervisory/processing function 45, a call control protocol retransmission function 46, a call control protocol transfer function 47, a terminal supervisory function 48, and a LAN interface 49. In the memory 43, a call control data slave table 431 is created.

The call control protocol conversion function 44 converts a call control protocol applied within the system of the MGC 2 into a call control protocol for communication with a terminal connecting to the LAN 200 and falling under the control of the IP-PBX and vice versa. The fault supervisory/processing function 45 and the call control protocol retransmission function 46 respectively execute fault event supervision, processing, and retransmission of layers 1 through 3. The call control protocol transfer function 47 transfers a call control protocol between the MGC 2 and a plurality of terminals that fall under the control of the IP-PBX. The terminal supervisory function 48 supervises the terminals being under the control of the IP-PBX.

In FIG. 3, the internal configuration of the PH 4, representative of the PHs 4-1 through 4-4, is shown, and it will be appreciated that the PHs 4-1 through 4-4 have the same configuration as the PH 4.

Referring to FIGS. 1 through 3, the IP-PBX according to the first preferred embodiment of the present invention will now be explained.

The IP-PBX 1 has the MGC 2 that performs call-control-processing tasks. The MGC 2 comprises the main processor 21, LAN interface 22, and memory 23, and the memory 23 has the call control data master table 231 to store call control data such as the phone number, IP (Internet Protocol) address, and port number of a terminal being under the control of the IP-PBX.

To the main processor 21, the system bus 101 of the MGC 2 is connected and the PHs 4-1, 4-2 are connected to the system bus 101. The LAN interface 22 connects to the switching hub 5-1 via the LAN 200. The control interface 3 for expanding the system bus 101 is installed on the system bus 101 and the expansion system bus 102 is connected to the control interface 3. The PHs 4-3, 4-4 are connected to the expansion system bus 102.

Inside each PH 4-1 through 4-4, the system bus interface 41 connecting to the system bus 101 or expansion system bus 102 connects to the microprocessor 42 that controls the PH 4-1 through 4-4. The microprocessor 42 operates with the memory 43 and the memory 43 includes the call control data slave table 431. The call control data slave table 431 is structured so that the upper limit to the number of terminals that can be controlled by the PH 4-1 through 4-4 will be greatest.

Also, to the microprocessor 42, the call control protocol conversion function 44, fault supervisory/processing function 45, call control protocol retransmission function 46, call control protocol transfer function 47, and terminal supervisory function 48 are connected. The call control protocol conversion function 44, fault supervisory/processing function 45, call control protocol retransmission function 46, call control protocol transfer function 47, and terminal supervisory function 48 can be embodied as either hardware components or software components. If these functions are embodied as software components, they are implemented in this way: after storing a program of code describing the functions into the memory 43, the microprocessor 42 executes the program.

Also, the microprocessor 42 connects to the LAN interface 49 and the LAN interface 49 is connected to the switching hubs 5-1, 5-2 via the LAN 200. The switching hubs 5-1, 5-2 are connected to the router 6.

On the other hand, the IP phones 7-1, 7-2 or the IPTA 8 that accommodates the non-IP phones 9-1, 9-2 which are not compliant with IP are connected to the switching hub 5-3. The switching hub 5-3 is connected to the router 6.

In the above-described configuration, the PHs 4-1 through 4-4 are the terminal interfaces of the IP-PBX 1, wherein a pair of the PH 4-1 and the PH 4-2 and a pair of the PH 4-3 and the PH 4-4 form redundant configurations, thus providing redundant terminal interfaces to the IP phones 7-1, 7-2, and IPTA 8.

However, the PH 4-3 may be paired with another protocol handler than the PH 4-4 to form a redundant configuration. In this example of the embodiment shown, the main processor of the MGC 2 is bound to be able to control the IP phones 7-1, 7-2, and the IPTA 8 that accommodates non-IP phones 9-1, 9-2 through the use of the PHs 4-3, 4-4.

Figure 4:
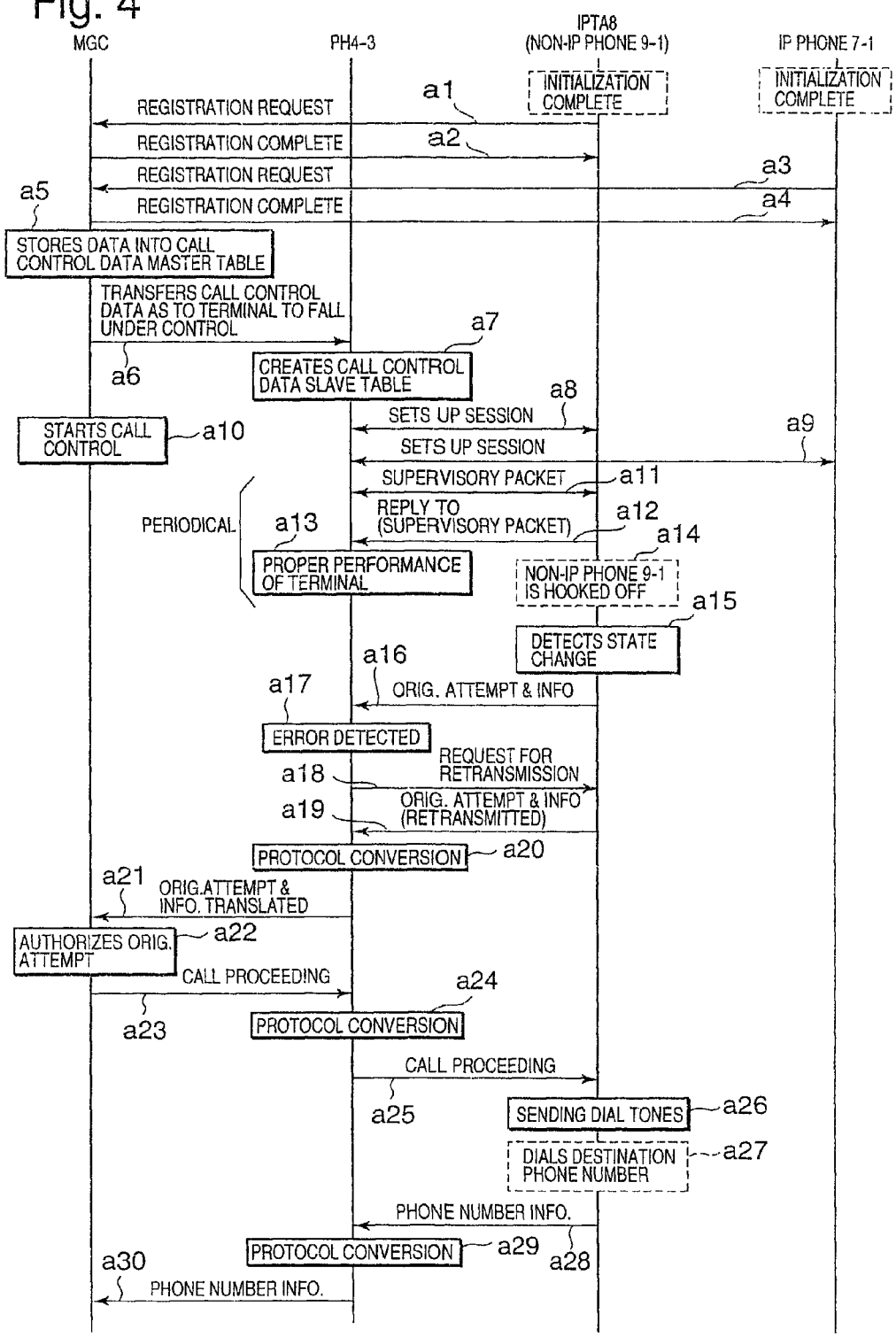
FIG. 4 is a sequence chart of operation of the IP-PBX according to the first preferred embodiment of the present invention.
Figure 5:
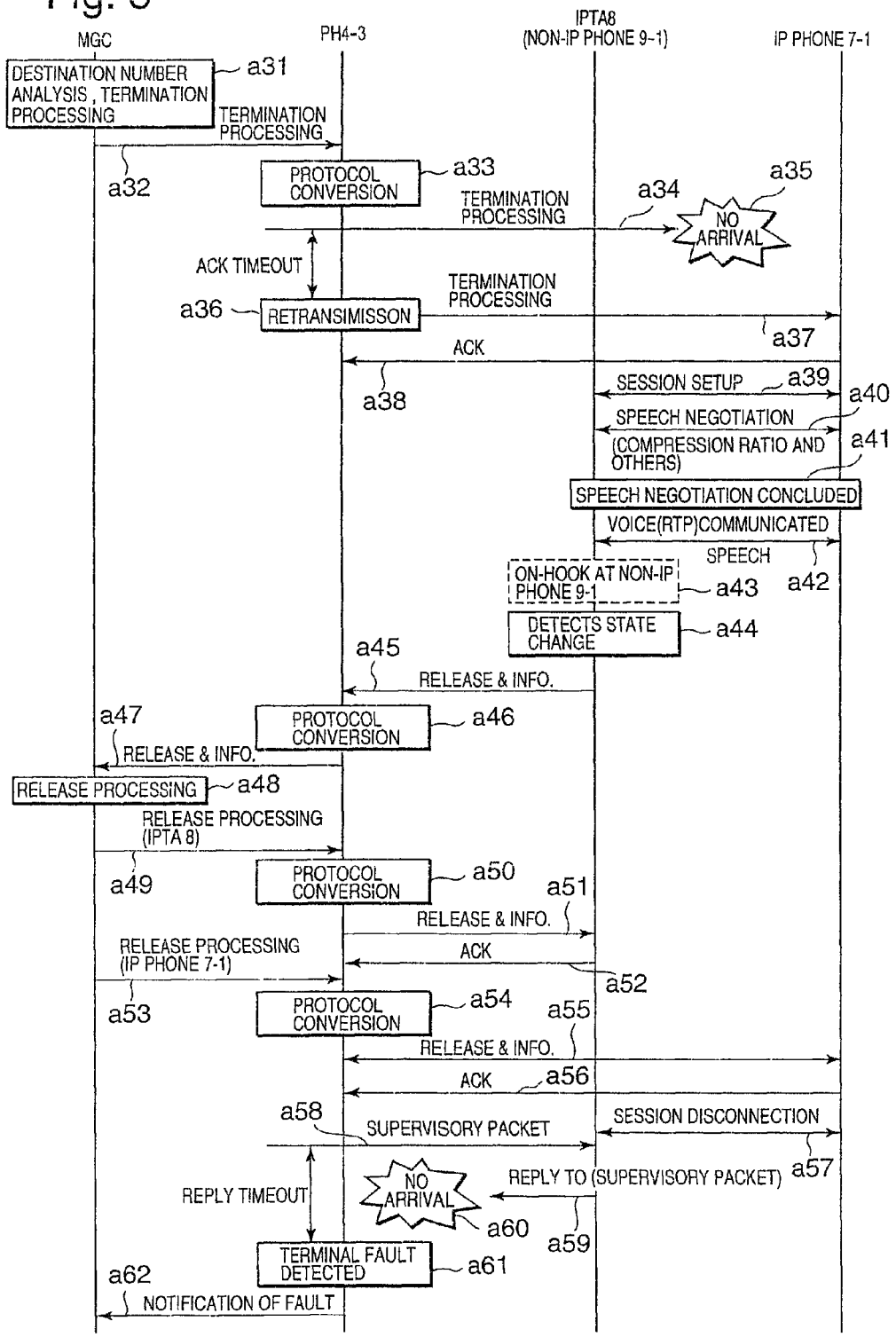
FIG. 5 is a sequence chart of operation of the IP-PBX according to the first preferred embodiment of the present invention.

FIG. 4 and FIG. 5 are sequence charts of operation of the IP-PBX 1 according to the first preferred embodiment of the present invention. Referring to FIGS. 1 through 5, operation of the IP-PBX 1 according to the first preferred embodiment of the present invention, particularly, call control operation with the PH 4-3 being operating and the PH 4-4 on standby will be explained below.

The IP-PBX 1 is controlled by the MGC 2. Upon the connection of the IP phones 7-1, 7-2 or IPTA 8 to the LAN 200, registration requests from these terminals are received by the LAN interface 22 of the MGC 2 and then passed to the main processor (a1 through a4 of FIG. 4).

The main processor 21 obtains information such as IP address, port number, and terminal attribute from the terminals, namely, the IP phones 7-1, 7-2, and IPTA 8, adds information required for call control, such as terminal's phone number, and stores these data into the call control data master table 231 on the memory 23 (a5 of FIG. 4).

The main processor 21 determines which PH be used to control a terminal that obtained permission and registered with the IP-PBX and is to fall under the control of the IP-PBX. For example, when the main processor 21 selects a PH 4-3, it extracts the call control data appropriate for the PH 4-3 from the call control data master table 231 and transfers that data to the PH 4-3, and the data is copied to the call control data slave table 431 on the PH 4-3 (a6 of FIG. 4).

Upon receiving the call control data from the main processor 21 of the MGC 2, the microprocessor 42 of the PH 4-3 stores the data into the call control data slave table 431 (a7 of FIG. 4) and sets up a session with the IP phone 7-1, 7-2 or IPTA 8 that falls under the control of the IP-PBX through the LAN interface 49 (a8, a9 of FIG. 4). When the microprocessor 42 of the PH 4-3 has set up the session, the MGC 2 starts call control (a10 of FIG. 4). Thereafter, the terminal supervisory function 48 periodically transmits a packet for supervising the terminal such as the IP phone 7-1, 7-2, or IPTA 8 for proper performance (all through a13 of FIG. 4).

Then, the operation for controlling call origination and termination will be described with a scenario where a call from a non-IP phone 9-1 terminates on an IP phone 7-1. When the non-IP phone 9-1 is hooked off (a14 of FIG. 4), the IPTA 8 detects state change (a15 of FIG. 4) and transmits an origination attempt and information in an IP packet via the switching hub 5-2, router 6, switching hub 5-1 to the LAN interface 49 of the PH 4-3 (a16 of FIG. 4).

On the PH 4-3, when the microprocessor 42 gets this origination attempt packet, using the call control protocol transfer function 47 (a19 of FIG. 4), it passes the origination attempt packet to the call control protocol conversion function 44 where the origination attempt and information in the IP packet are converted into a format as per the protocol supported by the main processor 21 (a20 of FIG. 4). The origination attempt and information translated by the protocol conversion are transferred to the main processor 21 through the system bus interface 41 (a21 of FIG. 4). For the origination attempt packet arrived at the PH 4-3, the call control protocol retransmission function 46 checks the IP packet received through the call control protocol transfer function 47 for an error, and, if an error is detected (a17 of FIG. 4), requests the IPTA 8 to retransmit the origination attempt packet (a18 of FIG. 4).

The main processor 21 authorizes the origination attempt and passes a call proceeding indication to the PH 4-3 (a22, a23 of FIG. 4). The PH 4-3 protocol converts the call proceeding instructions and generates an IP packet of call proceeding (a24 of FIG. 4) and then transmits the IP packet to the IPTA 8 (a25 of FIG. 4). Upon receiving the IP packet, the IPTA 8 gives a command to send dial tones to the non-IP phone 9-1 (a26 of FIG. 4).

When a destination phone number is input from the non-IP phone 9-1 (a27 of FIG. 4), the IPTA 8 transmits the phone number information in an IP packet to the PH 4-3 (a28 of FIG. 4). The PH 4-3 protocol converts the IP packet received from the IPTA 8 and transfers the phone number information translated by the protocol conversion to the main processor 21 (a 20, a30 of FIG. 4).

From the call origination information, the main processor 21 looks for a PH to which to pass termination information, using the call control data master table 231 and transfers the termination information to the PH (in this case, it is assumed that the PH 4-3 is used) (a31, a32 of FIG. 5). The microprocessor 42 of the PH 4-3 receives the termination information for the IP phone 7-1 through the system bus interface 41.

The microprocessor 42 searches the call control data slave table 431 for the IP address, port number, etc. of the IP phone 7-1 to which the termination information is to be transmitted and the call control protocol conversion function 44 converts the termination information from the main processor 21 to data in an IP packet according to the network protocol. The IP packet and the above IP address, port number, etc. of the IP phone 7-1 are passed to the call control protocol transfer function 47 and the IP packet is transmitted through the LAN interface 49 (a33, a34 of FIG. 5).

The above IP packet of termination information is passed through the switching hub 5-1, router 6, switching hub 5-3, and arrives at the IP phone 7-1, and then the ringer of the IP phone 7-1 sounds. If the PH 4-3 receives a retransmission request from the IP phone 7-1, the call control protocol retransmission function 46 retransmits the termination information (a35 through a37 of FIG. 5). A release process flow (a38 through a62 of FIG. 5) is the same as the call origination process and, therefore, its explanation is not repeated.

Moreover, as concerns call control data to be passed in the direction from the MGC 2 toward the IP phone, for example, if the specified number of a destination terminal falling under the control of the IP-PBX is not registered in the call control data slave table 431 of the PH 4-3, the fault supervisory/processing function 45 detects that and the microprocessor 42 warns the main processor 21.

On the other hand, the PH 4-4 on standby, like the operating PH 4-3, has the same copy in its call control data slave table 431 as the call control data copied from the call control data master table 213 on the memory 23 of the main processor 23 to the call control data slave table 431 of the PH 4-3 and is set in the standby state. Setting the PH 4-4 in the standby state can be carried out in such a manner that the microprocessor 42 has a standby flag set on the memory 43.

Figure 6:
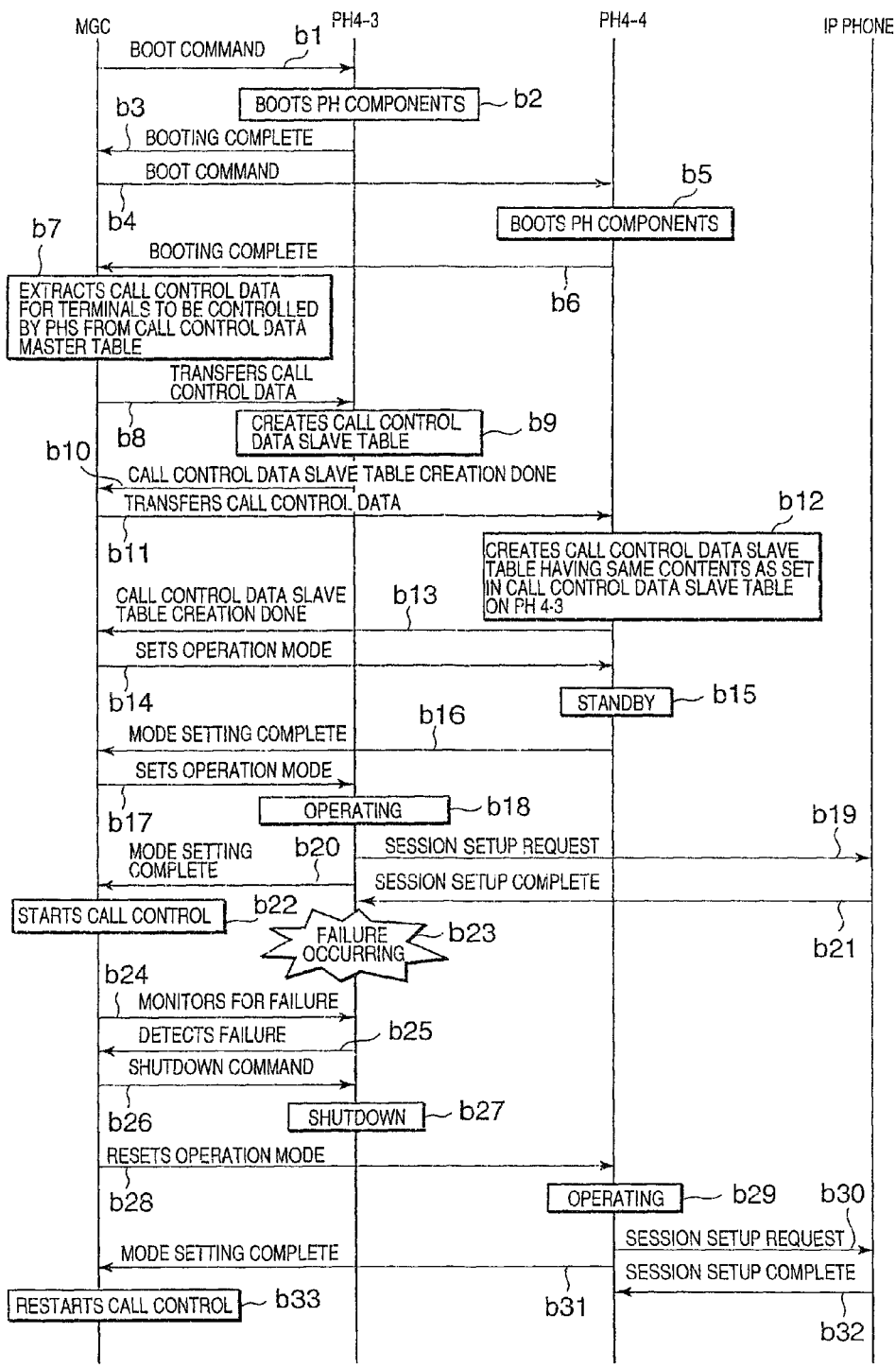
FIG. 6 is a sequence chart of changeover operation between the terminal interfaces in the redundant configuration according to the first preferred embodiment of the present invention.

FIG. 6 is a sequence chart of changeover operation between the terminal interfaces in the redundant configuration in the first preferred embodiment of the present invention. FIG. 6 illustrates the terminal interface changeover sequence in the event that failure has occurred in the PH 4-3. Referring to FIGS. 1 through 3 and 6, the changeover operation between the terminal interfaces in the redundant configuration in the first preferred embodiment of the present invention will be explained.

First, when the MGC 2 sends a boot command to the PHs 4-3, 4-4 (b1, b4 of FIG. 6), the PHs 4-3, 4-4 boots their components (b2, b5 of FIG. 6) and notifies the MGC 2 of booting complete (b3, b6 of FIG. 6). Then, the MGC 2 extracts call control data for terminals to be controlled by the PHs among those falling under the control of the IP-PBX from the call control data master table 231 (b7 of FIG. 6) and transfers the call control data to the PHs 4-3, 4-4 (b8, b11 of FIG. 6).

Each of the PHs 4-3, 4-4 creates a call control data slave table 431 (b9, b12 of FIG. 6), based on the call control data for the terminals to be controlled by them, transferred from the call control data master table 231, and notifies the MGC 2 that it has created the call control data slave table 431 (b10, b13 of FIG. 6).

When the call control data slave tables 431 have been created on the PHs 4-3, 4-4, the MGC 2 sets the operation modes of the PHs 4-3, 4-4 (b14, b17 of FIG. 6); it sets the PH 4-4 in the standby state (b15, b16 of FIG. 6) and the PH 4-3 in the operating state (b18, b20 of FIG. 6).

When the PH 4-3 has been set in the operating mode, it sends a session setup request to the IP phones 7-1, 7-2 or IPTA 8 (b19 of FIG. 6) and receives the notification of session setup complete from the IP phones 7-1, 7-2 or IPTA 8 (b21 of FIG. 6), and the MGC 2 starts call control (b22 of FIG. 6).

In this state, when failure occurs in the PH 4-3 (b23 of FIG. 6), the main processor 21 of the MGC 2 detects the failure of the PH 4-3, shuts down the PH 4-3 and sets it on standby (b24 through b27 of FIG. 6). At the same time, the main processor 21 of the MGC 2 commands the microprocessor 42 of the PH 4-4 to enter the operating mode (b28, b29, b31 of FIG. 6).

The PH 4-4 sends a session setup request via the LAN interface 49 and switching hub 5-2 to the IP phones 7-1, 7-2 and IPTA 8 that are the terminals to be controlled by the PH, registered in the call control data slave table 431 (b30, b32 of FIG. 6).

After the session setup, the microprocessor 42 notifies the terminals to be controlled by the PH that the PH 4-4 has become operating via the call control protocol transfer function 47, LAN interface 49, and switching hub 5-2. After that, the IP phones 7-1, 7-2 or IPTA 8 recognizes the PH 4-4 as the terminal interface and sends and receives call control data to/from it, and the call control by the MGC 2 restarts (b33 of FIG. 6).

Figure 7:
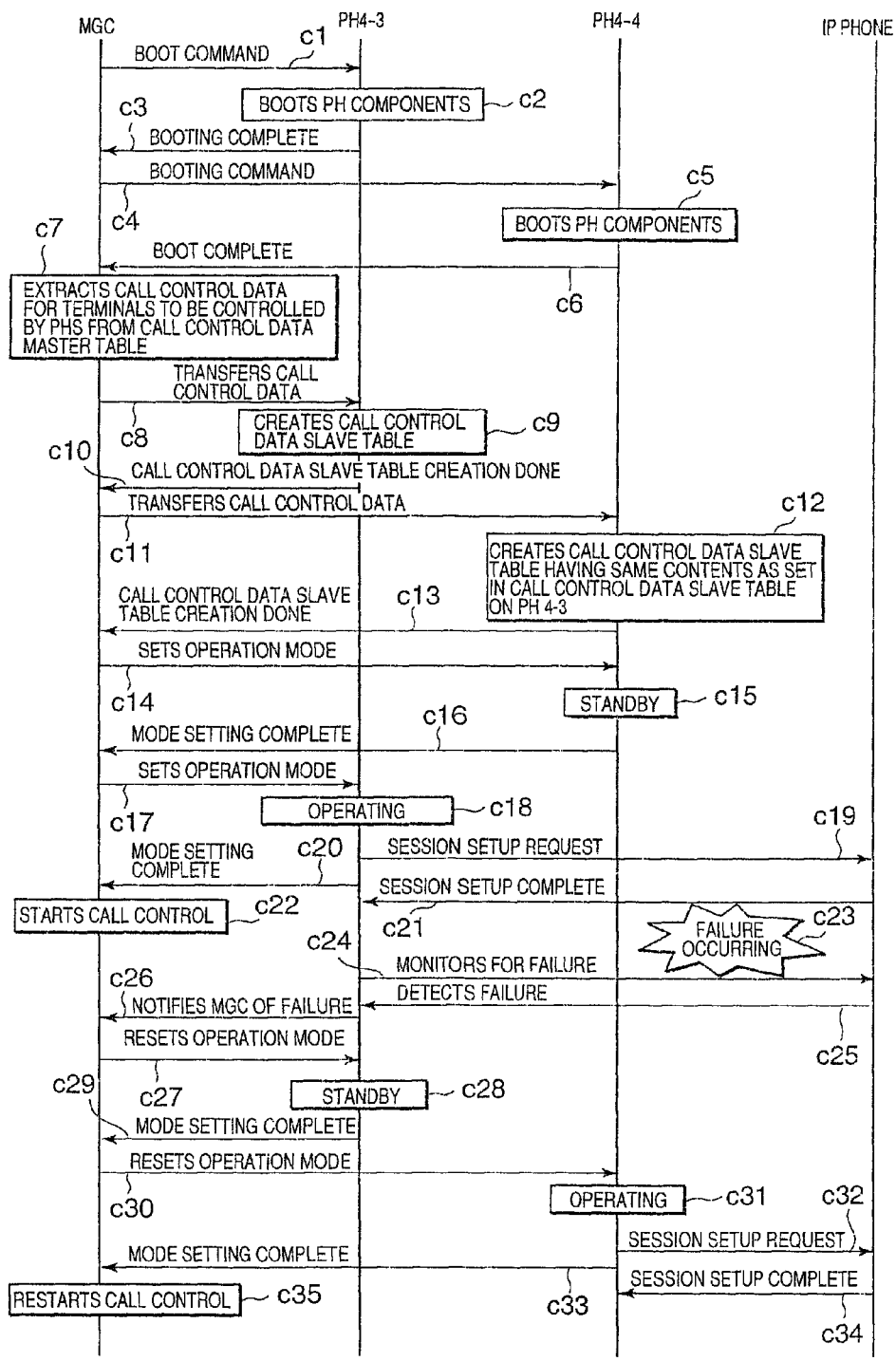
FIG. 7 is a sequence chart of changeover operation between the terminal interfaces in the redundant configuration according to the second preferred embodiment of the present invention.

FIG. 7 is a sequence chart of changeover operation between the terminal interfaces in the redundant configuration in a second preferred embodiment of the present invention. In the system configuration shown in FIG. 1, FIG. 7 illustrates the terminal interface changeover sequence in the event that failure has occurred in the switching hub 5-1 or the LAN 200 between the LAN interface 49 and the switching hub 5-1 when the PH 4-3 is operating. Referring to FIG. 7, the changeover operation between the terminal interfaces in the redundant configuration in the second preferred embodiment of the present invention will be explained.

Because the configuration of the IP-PBX according to the second preferred embodiment of the present invention and its system configuration are the same as those shown in FIGS. 1 through 3, the changeover operation will be explained, using FIGS. 1 through 3 also. The operations (c1 through c22) before failure occurs in FIG. 7 are the same as the corresponding operations (b1 through b22) in FIG. 6, and, therefore, their explanation is not repeated.

The terminal supervisory function 48 of the PH 4-3 periodically monitors the IP phones 7-1, 7-2 and IPTA 8 that are the terminals to be controlled by the PH and, when it detects terminal failure (c23 through c25 of FIG. 7), if it detected that a plurality of the terminals to be controlled have failed, the terminal supervisory function 48 does not judge it as terminal failure. Instead, it determines that a network failure has occurred and notifies the main processor 21 of the network failure via the switching hub 5-1 (c26 of FIG. 7).

In this case, the main processor 21 commands the microprocessor 42 of the PH 4-3 to enter the standby mode (c27 through c29 of FIG. 7) and the microprocessor 42 of the PH 4-4 to enter the operating mode (c30, c31, c33 of the FIG. 7).

The PH 4-4 sends a session setup request via the LAN interface 49 and switching hub 5-2 to the IP phones 7-1, 7-2 and IPTA 8 that are the terminals to be controlled by the PH, registered in the call control data slave table 431 (c32 of FIG. 7). After the session setup (c34 of FIG. 7), the microprocessor 42 notifies the terminals to be controlled by the PH that the PH 4-4 has become operating via the call control protocol transfer function 47, LAN interface 49, and switching hub 5-2.

After that, the IP phones 7-1, 7-2 or IPTA 8 recognizes the PH 4-4 as the terminal interface and sends and receives call control data to/from it via the switching hub 5-2, and the call control by the MGC 2 restarts (c35 of FIG. 7).

Figure 8:
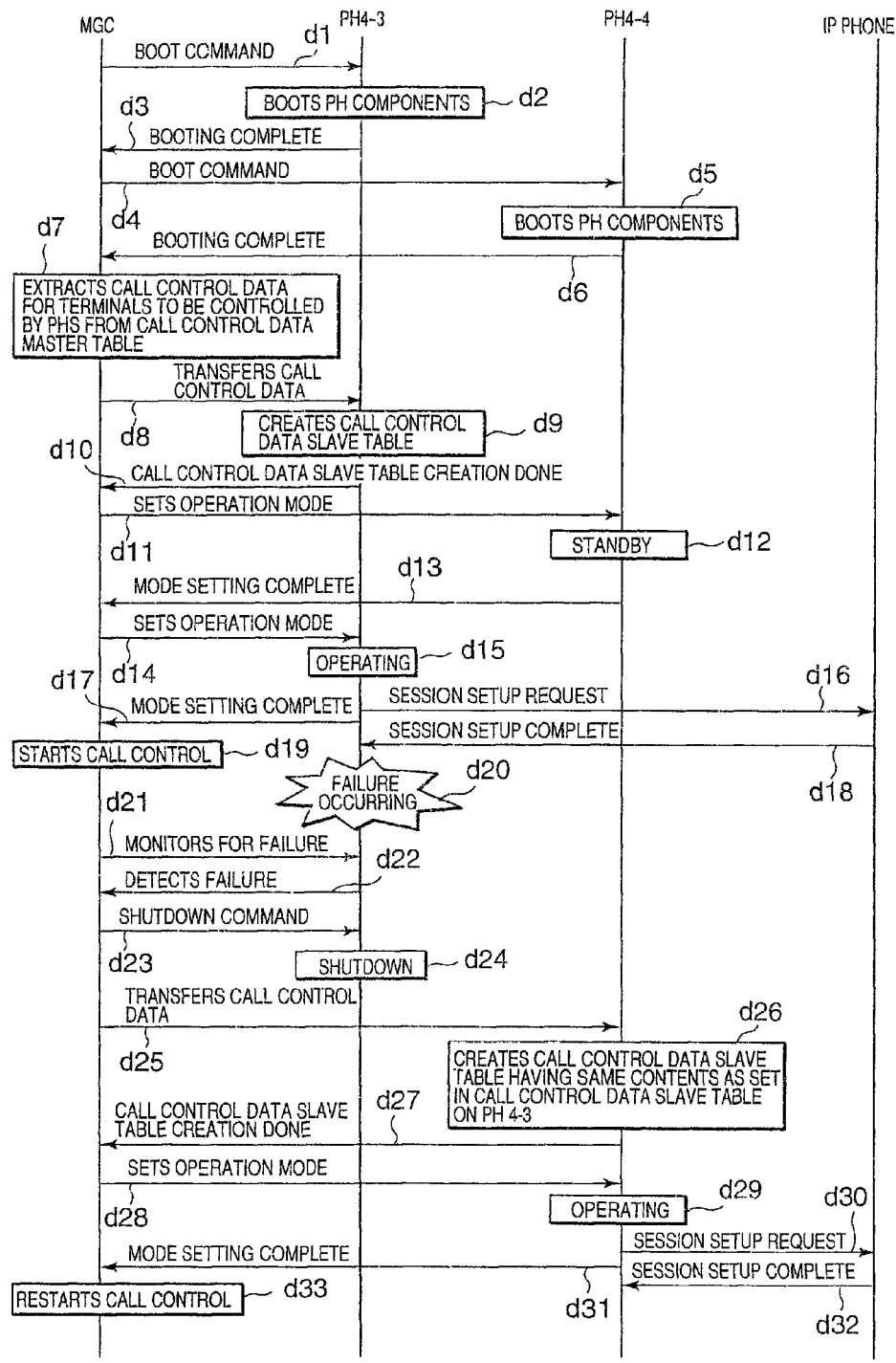
FIG. 8 is a sequence chart of changeover operation between the terminal interfaces in the redundant configuration according to the third preferred embodiment of the present invention.

FIG. 8 is a sequence chart of changeover operation between the terminal interfaces in the redundant configuration in a third preferred embodiment of the present invention. In the system configuration shown in FIG. 1, FIG. 8 illustrates the terminal interface change over sequence in the event that failure has occurred in the PH 4-3. Referring to FIG. 8, the change over operation between the terminal interfaces in the redundant configuration in the third preferred embodiment of the present invention will be explained. Because the configuration of the IP-PBX according to the third preferred embodiment of the present invention and its system configuration are the same as those shown in FIGS. 1 through 3, the changeover operation will be explained, using FIGS. 1 through 3 also.

In the third preferred embodiment of the present invention, the same call control data is not copied to the call control data slave table 431 on the PH 4-4 in the initial state. When the main processor 21 determines that the PH 4-3 has failed, the same call control data as copied from the call control data master table 231 on the memory 23 of the main processor 21 to the call control data slave table 431 on the PH 4-3 is copied to the call control data slave table 431 on the PH 4-4.

First, when the MGC 2 sends a boot command to the PHs 4-3, 4-4 (d1, d4 of FIG. 8), the PHs 4-3, 4-4 boots their components (d2, d5 of FIG. 8) and notifies the MGC 2 of booting complete (d3, d6 of FIG. 8). Then, the MGC 2 extracts call control data for terminals to be controlled by the PHs among those falling under the control of the IP-PBX from the call control data master table 231 (d7 of FIG. 8) and transfers the call control data to the PH 4-3 (d8 of FIG. 8).

The PH 4-3 creates a call control data slave table 431 (d9 of FIG. 8), based on the call control data for the terminals to be controlled by them, transferred from the call control data master table 231, and notifies the MGC 2 that it has created the call control data slave table 431 (d10 of FIG. 8).

When the call control data slave tables 431 have been created on the PH 4-3, the MGC 2 sets the operation modes of the PHs 4-3, 4-4 (d11, d14 of FIG. 8); it sets the PH 4-4 in the standby state (d12, d13 of FIG. 8) and the PH 4-3 in the operating state (d15, d17 of FIG. 8).

When the PH 4-3 has been set in the operating mode, it sends a session setup request to the IP phones 7-1, 7-2 or IPTA 8 (d16 of FIG. 8) and receives the notification of session setup complete from the IP phones 7-1, 7-2 or IPTA 8 (d18 of FIG. 8), and the MGC 2 starts call control (d19 of FIG. 8).

In this state, when failure occurs in the PH 4-3 (d20 of FIG. 8), the main processor 21 of the MGC 2 detects the failure of the PH 4-3, shuts down the PH 4-3 and sets it on standby (d21 through d24 of FIG. 8).

At the same time, the min processor 21 of the MGC 2 transfers the same call control data as copied from the call control data master table 231 on the memory 23 to the call control data slave table 431 on the PH 4-3 to the PH 4-4 (d25 of FIG. 8), and, therefore, the PH 4-4 creates the call control data slave table 431 having the same contents as set in the call control data slave table 431 on the PH 4-3 (d26, d27 of FIG. 8).

After that, the main processor 21 of the MGC 2 commands the microprocessor 42 of the PH 4-4 to enter the operating mode (d28, d29, d31 of FIG. 8). The PH 4-4 sends a session setup request via the LAN interface 49 and switching hub 5-2 to the IP phones 7-1, 7-2 and IPTA 8 that are the terminals to be controlled by the PH, registered in the call control data slave table 431 (d30 of FIG. 8).

After the session setup (d32 of FIG. 8), the microprocessor 42 notifies the terminals to be controlled by the PH that the PH 4-4 has become operating via the call control protocol transfer function 47, LAN interface 49, and switching hub 5-2.

After that, the IP phones 7-1, 7-2 or IPTA 8 recognizes the PH 4-4 as the terminal interface and sends and receives call control data to/from it, and the call control by the MGC 2 restarts (d33 of FIG. 8).

Figure 9:
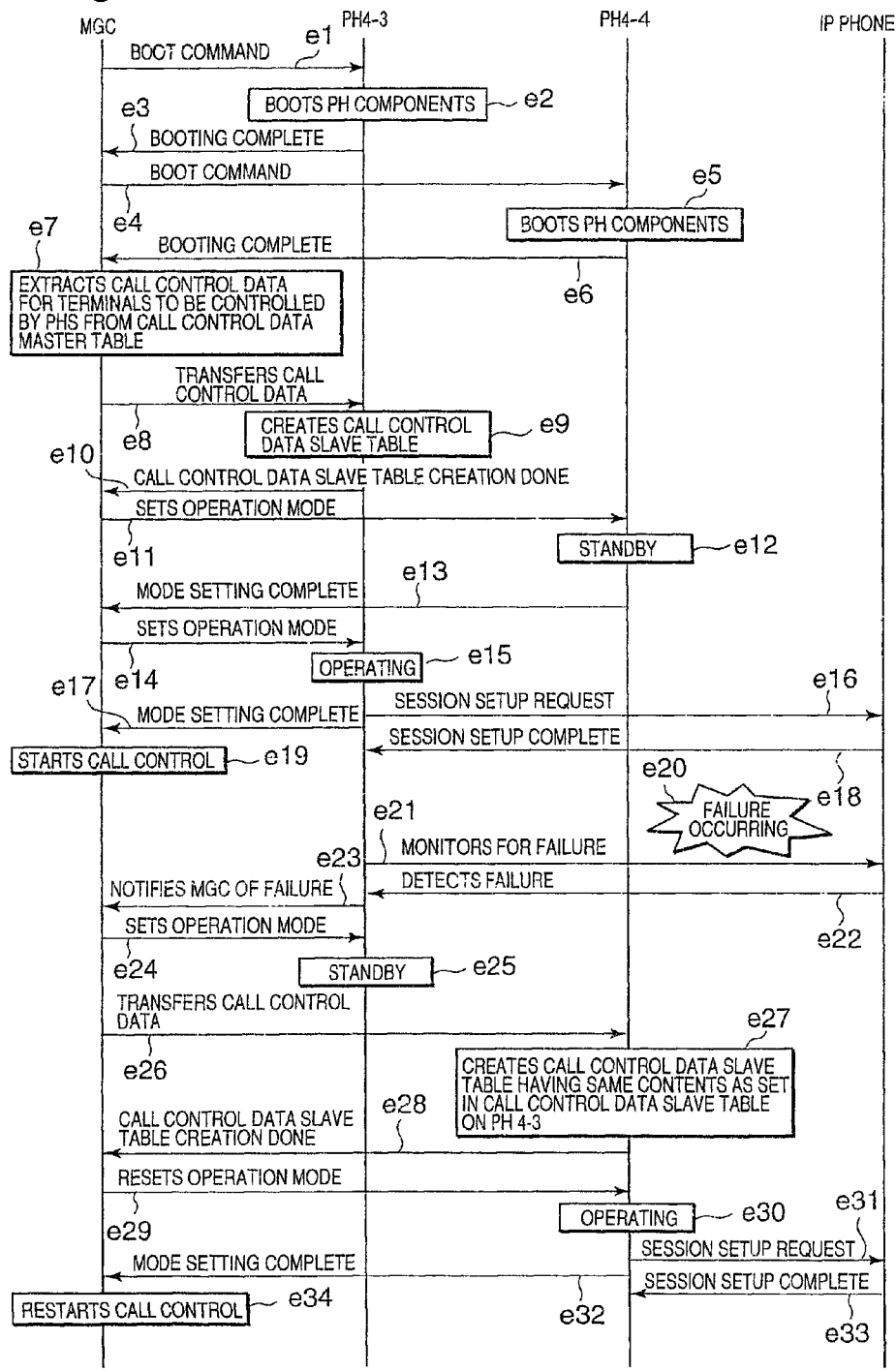
FIG. 9 is a sequence chart of changeover operation between the terminal interfaces in the redundant configuration according to the fourth preferred embodiment of the present invention.

FIG. 9 is a sequence chart of changeover operation between the terminal interfaces in the redundant configuration in a fourth preferred embodiment of the present invention. In the system configuration shown in FIG. 1, FIG. 9 illustrates the terminal interface changeover sequence in the event that failure has occurred in the switching hub 5-1 or the LAN 200 between the LAN interface 49 and the switching hub 5-1 when the PH 4-3 is operating. Referring to FIG. 9, the changeover operation between the terminal interfaces in the redundant configuration in the fourth preferred embodiment of the present invention will be explained.

Because the configuration of the IP-PBX according to the fourth preferred embodiment of the present invention and its system configuration are the same as those shown in FIGS. 1 through 3, the changeover operation will be explained, using FIGS. 1 through 3 also. The operations (e1 through e19) before failure occurs in FIG. 9 are the same as the corresponding operations (d1 through d19) in FIG. 8, and, therefore, their explanation is not repeated.

The terminal supervisory function 48 of the PH 4-3 periodically monitors the IP phones 7-1, 7-2 and IPTA 8 that are the terminals to be controlled by the PH and, when it detects terminal failure (e20 through e22 of FIG. 9), if it detected that a plurality of the terminals to be controlled have failed, the terminal supervisory function 48 does not judge it as terminal failure. Instead, it determines that a network failure has occurred and notifies the main processor 21 of the network failure via the switching hub 5-1 (e23 of FIG. 9).

In this case, the main processor 21 commands the microprocessor 42 of the PH 4-3 to enter the standby mode (e24, e25 of FIG. 9) and transfers the same call control data as copied from the call control data master table 231 on the memory 23 to the call control data slave table 431 on the PH 4-3 to the PH 4-4 (e26 of FIG. 9), and, therefore, the PH 4-4 creates the call control data slave table 431 having the same contents as set in the call control data slave table 431 on the PH 4-3 (e27, e28 of FIG. 9).

After that, the main processor 21 of the MGC 2 commands the microprocessor 42 of the PH 4-4 to enter the operating mode (e29, e30, e32 of FIG. 9). The PH 4-4 sends a session setup request via the LAN interface 49 and switching hub 5-2 to the IP phones 7-1, 7-2 and IPTA 8 that are the terminals to be controlled by the PH, registered in the call control data slave table 431 (e31 of FIG. 9).

After the session setup (e33 of FIG. 9), the microprocessor 42 notifies the terminals to be controlled by the PH that the PH 4-4 has become operating via the call control protocol transfer function 47, LAN interface 49, and switching hub 5-2. After that, the IP phones 7-1, 7-2 or IPTA 8 recognizes the PH 4-4 as the terminal interface and sends and receives call control data to/from it, and the call control by the MGC 2 restarts (e34 of FIG. 9).

By realizing the above-described configurations, the IP-PBX 1 of the present invention becomes able to cope with both failure of one of its terminal interfaces and failure occurred in network component equipment or LAN wiring and it is feasible to redundantly configure its terminal interfaces.

It is not necessary to manage the PHs 4-1 through 4-4 that are the terminal interfaces in fixed pairs of protocol handlers, which has been practiced heretofore, and redundancy can be provided by ensuring the allocation of one or more protocol handlers to operate in place of the protocol handler in which failure has occurred. That is, the protocol handler to operate in place of the PH 4-3 is not only the PH 4-4, but also PH 4-1 and PH 4-2 may back up of the PH 4-3, when appropriate.

Figure 10:
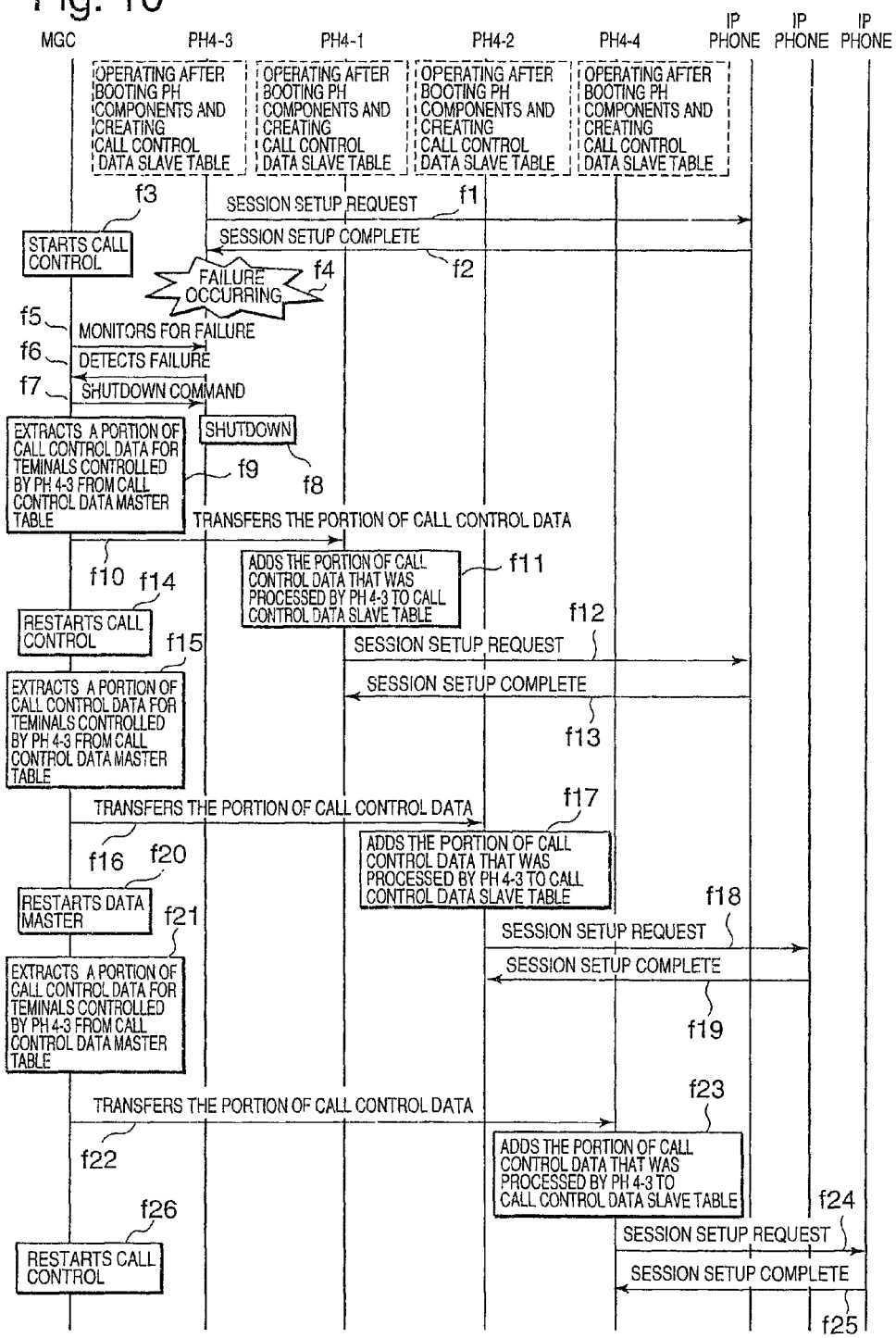
FIG. 10 is a sequence chart of changeover operation between the terminal interfaces in the redundant configuration according to the fifth preferred embodiment of the present invention.

FIG. 10 is a sequence chart of changeover operation between the terminal interfaces in the redundant configuration in a fifth preferred embodiment of the present invention. In the system configuration shown in FIG. 1, FIG. 10 illustrates the terminal interface changeover sequence in a scenario that the call control data registered in the call control data slave table 431 on the PH 4-3 cannot be backed up completely by only a single protocol handler to operate in place of the PH 4-3 in the event that failure has occurred in the PH 4-3. Referring to FIG. 10, the changeover operation between the terminal interfaces in the redundant configuration in the fifth preferred embodiment of the present invention will be explained. Because the configuration of the IP-PBX according to the fifth preferred embodiment of the present invention and its system configuration are the same as those shown in FIGS. 1 through 3, the changeover operation will be explained, using FIGS. 1 through 3 also.

In FIG. 10, all the PHs 4-1 through 4-4 are operating and the call control data registered in the call control data slave table 431 on the PH 4-3 differs from the call control data registered in the call control data slave tables 431 on the PHs 4-1, 4-2, and 4-4.

When the call control data slave tables 431 on the PHs 4-1, 4-2, and 4-4 have the data for the terminals that do not reach the upper limit to the number of terminals to be controlled by PH, if the number of terminals controlled by the PH 4-3 from which changeover must be performed in the event of failure occurring in the PH 4-3 exceeds the number of additional terminals that are allowed to be registered as the terminals to be controlled by PH in every control data slave table 431 on the PHs 4-1, 4-2, and 4-4, the main processor 21 of the MGC 2 selects a plurality of protocol handlers to operate in place of the PH 4-3, such as the PHs 4-1, 4,2, and 4-4, to which it downloads the call control data for the terminals controlled by the PH 4-3 from the call control data master table 231, wherein, the call control data is shared among and copied to the PHs 4-1, 4,2, and 4-4 corresponding to the number of terminals for which the task of control is assigned to each of the PHs 4-1, 4,2, and 4-4.

After the MGC 2 starts call control when all the PHs 4-1 through 4-4 are operating (f1 through f3 of FIG. 10), in the event that failure has occurred in the PH 4-3 (f4 of FIG. 10), the main processor 21 of the MGC 2 detects the failure of the PH 4-3, shuts down the PH 4-3, and sets it on standby (f5 through f8 of FIG. 10).

Then, the main processor 21 checks the number of terminals controlled by the PH 4-3 and the number of additional terminals that are allowed to be registered with the PH 4-1, extracts a portion of the call control data for the terminals controlled by the PH 4-3 within the limit to the allowable number of terminals to be assigned to the PH 4-1 from the call control data master table 231, and transfers it to the PH 4-1 (f9, f10 of FIG. 10). The PH 4-1 adds the portion of the call control data that was processed by the PH 4-3 to its call control data slave table 431 (f11 of FIG. 10).

The PH 4-1 sends a session setup request to the terminals for which the task of control has now been assigned to it (f12 of FIG. 10), and, after the session setup (f13 of FIG. 10), the MGC 2 restarts the call control (f14 of FIG. 10).

For the call control data for the terminals controlled by the PH 4-3, remaining after its portion is copied to the call control data slave table 431 on the PH 4-1, then, the main processor 21 checks the number of additional terminals that are allowed to be registered with the PH 4-2, extracts a portion of the call control data for the terminals controlled by the PH 4-3 within the limit to the allowable number of terminals to be assigned to the PH 4-2 from the call control data master table 231, and transfers it to the PH 4-2 (f15, f16 of FIG. 10). The PH 4-2 adds the portion of the call control data that was processed by the PH 4-3 to its call control data slave table 431 (f17 of FIG. 10).

The PH 4-2 sends a session setup request to the terminals for which the task of control has now been assigned to it (f18 of FIG. 10), and, after the session setup (f19 of FIG. 10), the MGC 2 restarts the call control (f20 of FIG. 10).

For the call control data for the terminals controlled by the PH 4-3, remaining after its portions are separately copied to the respective call control data slave tables 431 on the PH 4-1 and PH 4-2, furthermore, the main processor 21 checks the number of additional terminals that are allowed to be registered with the PH 4-4, extracts a portion of the call control data for the terminals controlled by the PH 4-3 within the limit to the allowable number of terminals to be assigned to the PH 4-4 from the call control data master table 231, and transfers it to the PH 4-4 (f21, f22 of FIG. 10). The PH 4-4 adds the portion of the call control data that was processed by the PH 4-3 to its call control data slave table 431 (f23 of FIG. 10).

The PH 4-4 sends a session setup request to the terminals for which the task of control has now been assigned to it (f24 of FIG. 10), and, after the session setup (f25 of FIG. 10), the MGC 2 restarts the call control (f26 of FIG. 10).

By implementing the above-illustrated procedure, a redundant configuration of terminal interfaces can be realized flexibly without preparing a fixed pair of terminal interfaces so that one terminal interface backs up of the other one in the event of failure of the other one. In consequence, a redundant configuration of terminal interfaces is feasible with low costs, dispensing with duplicated terminal interfaces.

Figure 11:
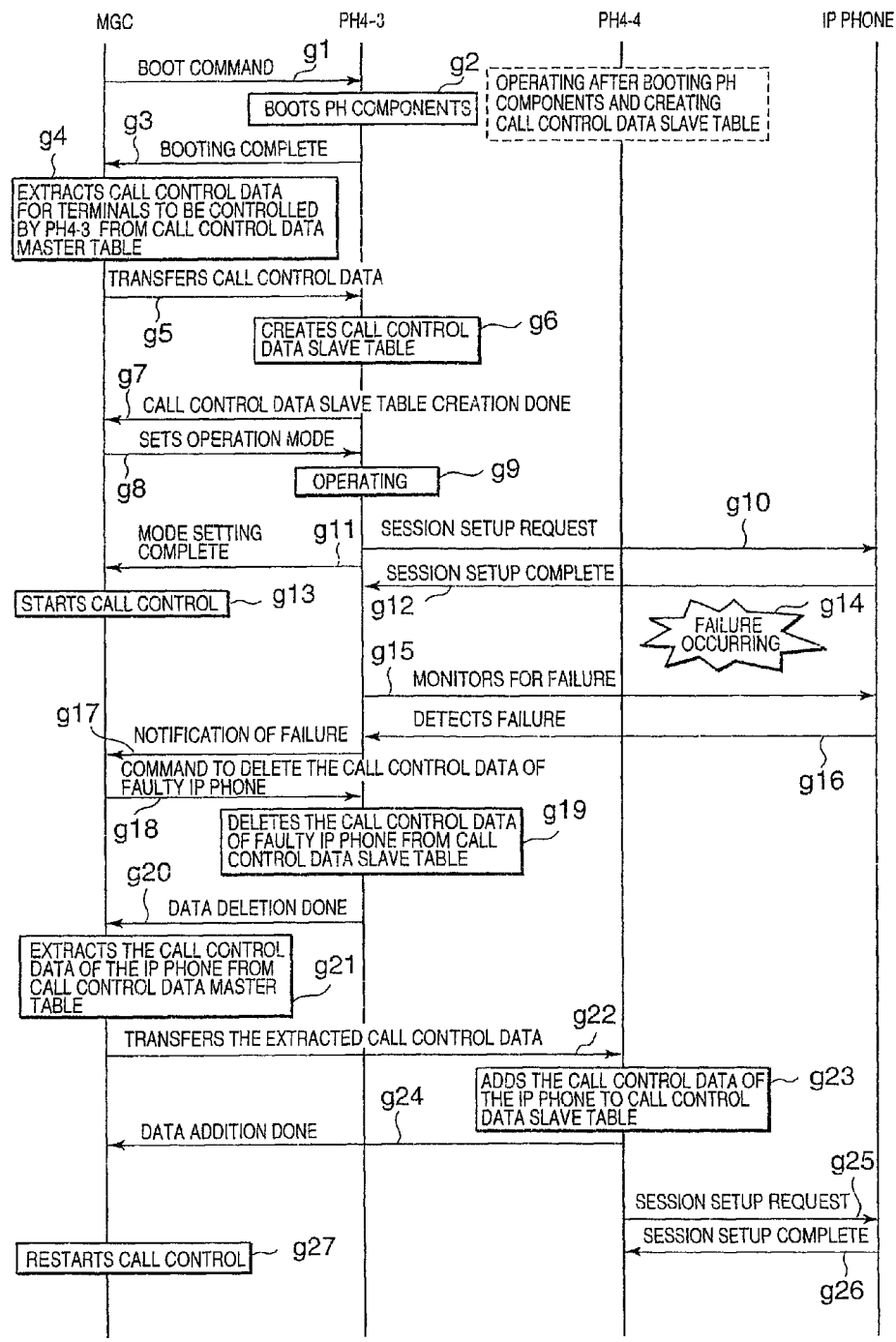
FIG. 11 is a sequence chart of changeover operation between the terminal interfaces in the redundant configuration according to the sixth preferred embodiment of the present invention.
Figure 12:
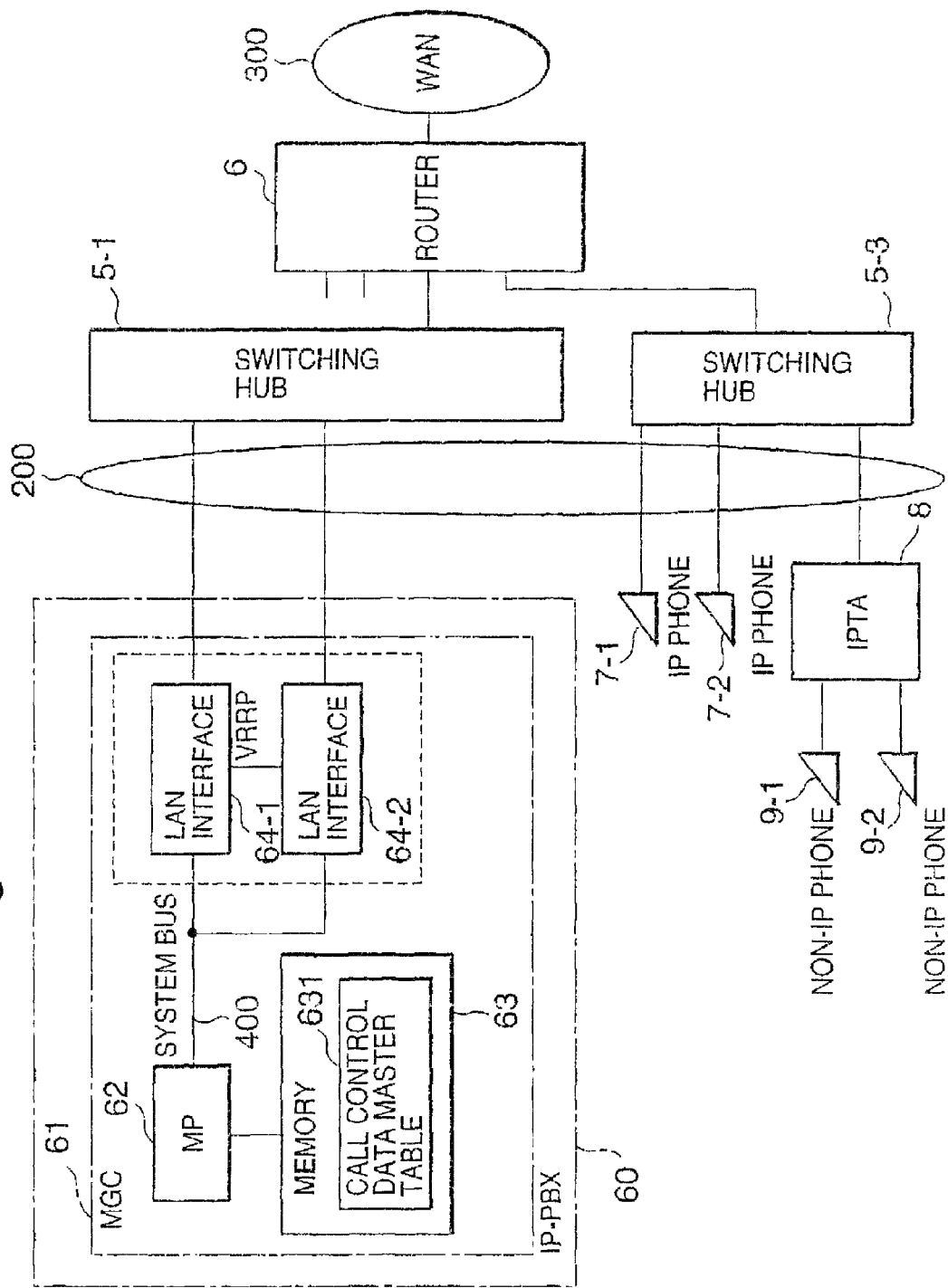
FIG. 12 is a block diagram showing an example of a redundant configuration of terminal interface in an IP-PBX by a prior art method.
Figure 13:
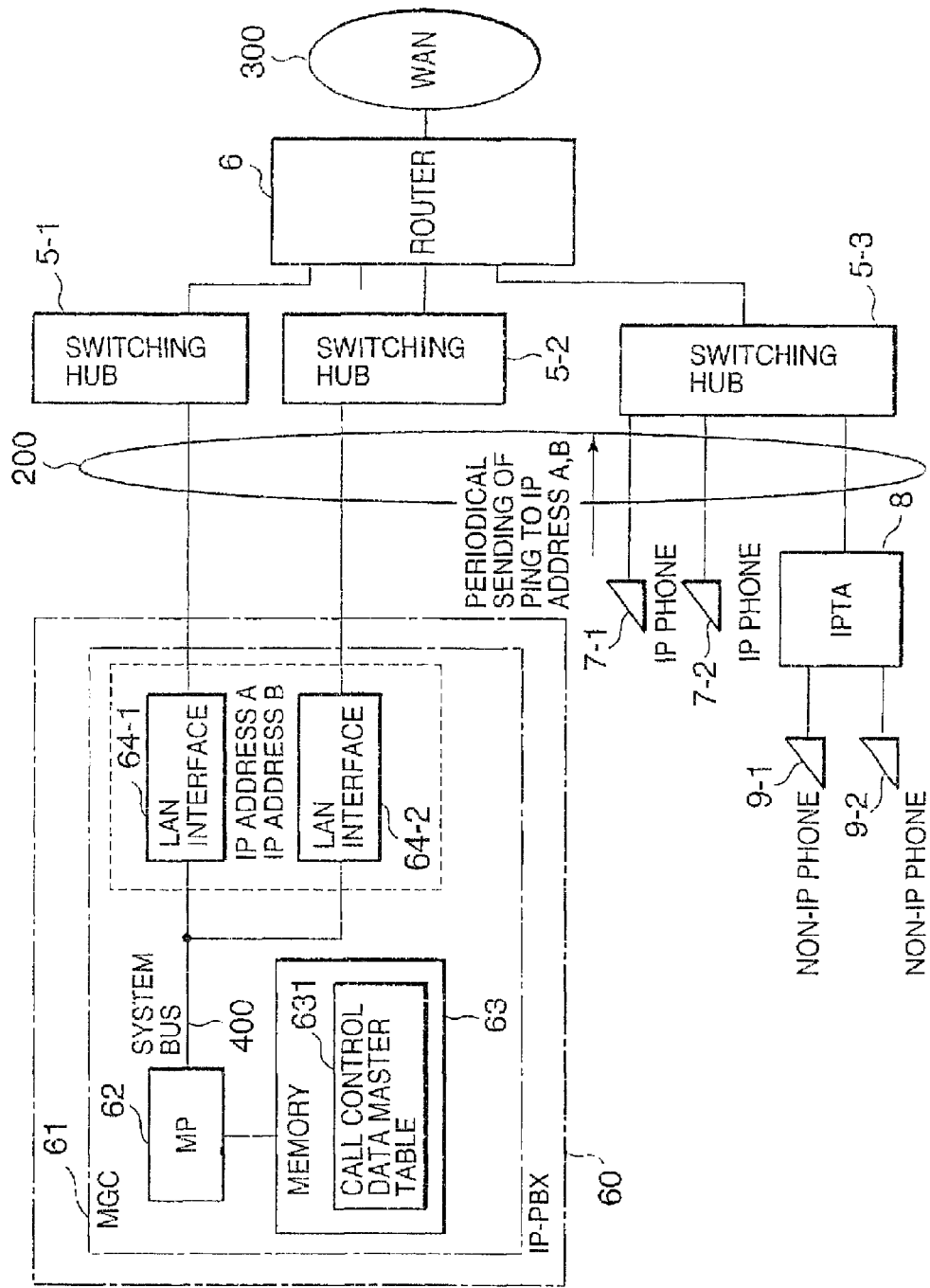
FIG. 13 is a block diagram showing another example of a redundant configuration of terminal interface in an IP-PBX by another prior art method.

FIG. 11 is a sequence chart of changeover operation between the terminal interfaces in the redundant configuration in a sixth preferred embodiment of the present invention. Referring to FIG. 11, the changeover operation between the terminal interfaces in the redundant configuration in the sixth preferred embodiment of the present invention will be explained. Because the configuration of the IP-PBX according to the sixth preferred embodiment of the present invention and its system configuration are the same as those shown in FIGS. 1 through 3, the changeover operation will be explained, using FIGS. 1 through 3 also.

In the sixth preferred embodiment of the present invention, in the redundant configuration of the terminal interfaces of the IP-PBX 1 shown in FIG. 1, the following are performed: a supervisory procedure in which the terminal supervisory function 48 of each of the operating ones of the PHs 4-1 through 4-4 periodically verifies the proper performance of the terminals for which the control task is assigned to the PH among the terminals falling under the control of the IP-PBX; a procedure in which the MGC 2 commands the PH to delete the call control data as to the terminal for which the PH failed to verify its proper performance from the call control data slave table 431 on the PH, one of the PHs 4-1 through 4-4; and a terminal re-registration procedure in which the MGC 2 copies again the call control data as to the terminal judged faulty from the call control data master table 231 to the call control data slave table 431 on another PH. Thereby, the MGC re-registers the terminal once judged faulty with another terminal interface and attempts the call control for the terminal.

First, when the MGC 2 sends a boot command to the PH 4-3 (g1 of FIG. 11), the PH 4-3 boots its components (g2 of FIG. 11 and notifies the MGC 2 of booting complete (g3 of FIG. 11) Then, the MGC 2 extracts the call control data for the terminals to be controlled by the PH 4-3 among those falling under the control of the IP-PBX from the call control data master table 231 (g4 of FIG. 11) and transfers the call control data to the PH 4-3 (g5 of FIG. 11).

The PH 4-3 creates a call control data slave table 431, based on the call control data for the terminals to be controlled by it, transferred from the call control data master table 231 (g6 of FIG. 11), and notifies the MGC 2 that it has created the call control data slave table 431 (g7 of FIG. 11).

When the call control data slave table 431 has been created on the PH 4-3, the MGC 2 sets the operation mode of the PH 4-3 (g8 of FIG. 11); it sets the PH 4-3 in the operating state (g9, g11 of FIG. 11). When set in the operating state, the PH 4-3 sends a session setup request to the IP phones 7-1, 7-2 or IPTA 8 (g10 of FIG. 11), receives the notification of session setup complete from the IP phones 7-1, 7-2 or IPTA 8 (g12 of FIG. 11), and the MGC 2 starts call control (g13 of FIG. 11). Meanwhile, the PH 4-4 is already operating and the call control data registered in the call control data slave table 431 on the PH 4-3 differs from the call control data registered in the call control data slave table 431 on the PH 4-4.

In the event that failure has occurred in the LAN 200 between the switching hub 5-1 or LAN interface 49 and the switching hub 501 when the PH 4-3 is operating (g14 of FIG. 11), the terminal supervisory function 48 of the PH 3 which periodically monitors the IP phone 7-1 that is a terminal controlled by the PH detects that the terminal has become faulty (g15, g16 of FIG. 11) When the microprocessor 42 detects the failure of the IP phone 7-1 by the terminal supervisory function 48, it notifies the main processor 21 of the failure of the IP phone 701 (g17 of FIG. 11).

The main processor 21 first commands the microprocessor 42 of the PH 4-3 to delete the call control data as to the IP phone 7-1 from the call control data slave table 431 (g18 of FIG. 11). By this command, the microprocessor 42 of the PH 4-3 deletes the call control data as to the IP phone 7-1 from the call control data slave table 431 (g19 of FIG. 11) and notifies the main processor 21 that it has deleted the call control data as to the IP phone 7-1 (g20 of FIG. 11)

The main processor 21 looks for a PH with which the IP phone 7-1 should be re-registered and determines to re-register it with the PH 4-4. Then, the main processor 21 extracts the call control data as to the IP phone 7-1 from the call control data master table 231 (g21 of FIG. 11) and commands the microprocessor 42 of the PH 4-4 to copy that call control data to the call control data slave table 431 (g22 of FIG. 11).

The PH 4-4 adds the call control data of the IP phone 7-1 transferred from the call control data master table 231 to the call control data slave table 431 (g23 of FIG. 11) and notifies the main processor 21 that it has added the data to the call control data slave table 431 (g24 of FIG. 11).

The PH 4-4 sends a session setup request to the IP phone 7-1, a terminal that has now been registered in its call control data slave table 431 so as to be controlled by the PH 4-4 via the LAN interface 49 and switching hub 5-2 (g25 of FIG. 11). After the session setup (g26 of FIG. 11), the microprocessor 42 notifies the IP phone 7-1 that the PH 4-4 has been put in interface operation with it via the call control protocol transfer function 47, LAN interface 49, and switching hub 5-2. After that, the IP phone 7-1 recognizes the PH 4-4 as the terminal interface and sends and receives call control data to/from it via the switching hub 5-2, and the MGC 2 restarts the call control (g27 of FIG. 11).

As described hereinbefore, in the present invention, in the event that failure has occurred in a terminal interface, for example, the PH 4-3 during the operation, the procedure of copying the call control data for the terminals controlled by the PH 4-3 from the call control data master table 231 to the call control data slave tables 431 on other PHs 4-1, 4-2, and 4-4, as appropriate, is performed. In the redundant configuration of the PHs 4-1 through PH 4-4 as the terminal interfaces, backup PHs are selectable rather than fixed. Thus, it is possible to construct redundant configurations of terminal interfaces flexibly and with low costs. In the present invention for redundant configurations of terminal interfaces, either duplicating the terminal interfaces (pairs of interfaces: one operating and the other on standby) or allocating one standby interface for a plurality of units of operating interfaces can be carried out selectively, according to the investment cost.

In the present invention, also, the procedure of selecting a plurality of backup PHs and sharing the call control data to be backed up among them is performed. In this procedure, for example, if the number of terminals controlled by the PH 4-3 that has failed or shut down by network failure, the call control data of the terminals being stored in the call control data slave table 431 on the PH 4-3, cannot be backed up completely by the call control data slave table 431 on one of the other PHs 4-1, 4-2, 4-4, the MGC 2 shares the call control data to the call control data slave tables 431 on the PHs 4-1, 4-2, 4-4 within the limit to the allowable number of terminals to be assigned to the PHs. Because the PHs 4-1 through 4-4, the terminal interfaces share the task of control of a failed one in this manner, it is not necessary to prepare a standby PH dedicated for backing up of another PH and it is possible to construct redundant configurations of terminal interfaces flexibly and with low costs.

In the present invention, furthermore, the following are performed: the supervisory procedure in which the terminal supervisory function 48 of each of the operating ones of the PHs 4-1 through 4-4 periodically verifies the proper performance of the terminals for which the control task is assigned to the PH among the terminals falling under the control of the IP-PBX; the procedure in which the MGC 2 commands the PH to delete the call control data as to the terminal for which the PH failed to verify its proper performance from the call control data slave table 431 on the PH, one of the PHs 4-1 through 4-4; and the terminal re-registration procedure in which the MGC 2 copies again the call control data as to the terminal judged faulty from the call control data master table 231 to the call control data slave table 431 on another PH. Thereby, the MGC re-registers the terminal once judged faulty with another terminal interface and attempts the call control for the terminal. The redundant configurations of the present invention allow for network route change. It is not necessary to prepare a standby PH dedicated for backing up of another PH and it is possible to construct redundant configurations of terminal interfaces flexibly and with low costs.

In this relation, in the present invention, the method is taken in which the PHs 4-1 through 4-4 periodically verify the proper performance of the IP phones 7-1, 7-2. Consequently, the quantity of packets for verifying the proper performance of this method can be half the quantity of packets required in the method in which the IP phones periodically verify the proper performance of two PHs in the redundant configuration.

The failure mentioned hereinbefore in the described embodiments includes congested IP packets. As IP packets of control data are transmitted across the LAN, the traffic carried over the LAN may become too high, causing more packet delay and discard than the permissible quantity on the router and the like. In that event, timeout tends to occur on the PHs and the terminal application level because of no reply from the corresponding end and the timeout disables call control.

In this case, hardware failure does not occur, but call control becomes impossible Failure may occur in the PHs, IPTA, IP phones, and LAN including the router and switching hubs. It is conceivable to perform PH changeover for periodical checks of the PHs for proper performance; that is, periodically change an operating PH to another PH and actually run each PH even if the operating PH performs well.

Although the terminal interfaces are protocol handlers in the embodiments described hereinbefore, they are not limited to the protocol handlers. In some implementations, the protocol handlers may not be employed; for example, in the following configuration. In a client-server-type system, the server on which a master table having client attribute data required for controlling clients is provided includes a plurality of terminal interfaces with the clients and the terminal interfaces each have a slave table to which a portion of the contents of the master table has been copied.

As described hereinbefore, the present invention produces advantageous effects that redundant configurations of terminal interfaces can be constructed flexibly and with low costs. In redundant configurations according to the invention, when failure has occurred in, at least, any of a plurality of protocol handlers connected to either the system bus or the expansion system bus of the multimedia gateway controller which performs call-control-processing tasks, the call control data for the terminals controlled by the failed protocol handler is copied from the call control data master table that is provided on the multimedia gateway controller and retains the call control data for all terminals falling under the control of the IP-PBX to the call control data slave table that is provided on another protocol hander and retains the copy of a portion of the call control data master table.

While this invention has been described with reference to a certain preferred embodiment, it is to be understood that the subject matter encompassed by the invention is not limited to this specific embodiment. Instead it is intended for the subject matter of the invention to include all such alternatives, modifications and equivalents as can be included within the spirit and scope of the following claims.

The invention claimed is:

1. An Internet Protocol compliant private branch electronic exchange which conducts switching control of terminals, the terminals including Internet Protocol compliant phones connecting to the Internet, an intranet, or a Local Area Network (LAN), and an Internet Protocol terminal adapter accommodating terminals not compliant with Internet Protocol and attaching Internet Protocol to the non-compliant terminals, the private branch electronic exchange comprising:
   a call control data master table provided on a multimedia gateway controller, the multimedia gateway controller performing call-control-processing tasks and retaining call control data for controlled terminals;
   a plurality of terminal interfaces connected to one of a system bus and an expansion system bus of said multimedia gateway controller;
   call control data slave tables provided respectively on each of said plurality of terminal interfaces, each slave table having a copy of a portion of said call control data master table,
   a failed terminal interface being one of the plurality of terminal interfaces that has failed to perform procedures for call control for corresponding controlled terminals; and
   a unit for copying the call control data for the corresponding controlled terminals of the failed terminal interface from said call control data master table to the call control data slave table on another terminal interface;

each of said terminal interfaces includes
a function of converting a call control protocol applied within the system of said multimedia gateway controller into a call control protocol for communication with a terminal connecting to said LAN, and vice versa, for call procedures between said multimedia gateway controller and the terminal connecting to said LAN;
a function of transferring a call control protocol between said multimedia gateway controller and the controlled terminals;
functions of performing fault supervision, processing, and retransmission, and a function of supervising the controlled terminals; and
an upper limit to the number of terminals that can be controlled by each of said terminal interfaces can be set individually.

2. An Internet Protocol compliant private branch electronic exchange, as claimed in claim 1, wherein said call control data comprises phone numbers, Internet Protocol addresses, and port numbers of the controlled terminals.

3. An Internet Protocol compliant private branch electronic exchange, as claimed in claim 1, further comprising:
a unit for selecting a plurality of terminal interfaces to provide additional back up capacity of the failed terminal interface, when the number of terminals, previously controlled by the failed terminal interface, exceeds an upper limit to the number of terminals, set for a back up terminal interface configured to normally back up the failed terminal interface; and
a unit of sharing the call control data as to the terminals under the control of the failed terminal interface between or among the plurality of selected terminal interfaces, and copying the shared portion of the call control data to said call control data slave tables on the plurality of selected terminal interfaces.

4. An Internet Protocol compliant private branch electronic exchange, as claimed in claim 2, further comprising:
a unit for selecting a plurality of terminal interfaces to provide additional back up capacity of the failed terminal interface, when the number of terminals, previously controlled by the failed terminal interface, exceeds an upper limit to the number of terminals, set for a back up terminal interface configured to normally back up the failed terminal interface; and
a unit of sharing the call control data as to the terminals under the control of the failed terminal interface between or among the plurality of selected terminal interfaces, and copying the shared portion of the call control data to said call control data slave tables on the plurality of selected terminal interfaces.

5. An Internet Protocol compliant private branch electronic exchange, as claimed in claim 1, further comprising: a unit for selecting a plurality of terminal interfaces to provide additional back up capacity of the failed terminal interface, when the number of terminals, previously controlled by the failed terminal interface, exceeds said upper limit to the number of terminals, set for a back up terminal interface configured to normally back up the failed terminal interface; and a unit of sharing the call control data as to the terminals under the control of the failed terminal interface between or among the plurality of selected terminal interfaces, and copying the shared portion of the call control data to said call control data slave tables on the plurality of selected terminal interfaces.

6. A method for redundantly configuring terminal interfaces of an Internet Protocol compliant private branch electronic exchange which conducts switching control of terminals, the terminals including, at least, Internet Protocol compliant phones which may connect to the Internet, an intranet, or a Local Area Network (LAN), and an Internet Protocol terminal adapter which accommodates terminals not compliant with Internet Protocol and attaches Internet Protocol to the terminals, comprising:
upon, among a plurality of terminal interfaces connected to one of a system bus and an expansion system bus of a multimedia gateway controller which performs call-control-processing tasks, any terminal interface failing to perform procedures for call control for any previously controlled terminal, copying the call control data for the terminals controlled by the failed terminal interface from a call control data master table to a call control data slave table, wherein,
the call control data master table is provided on said multimedia gateway controller, said multimedia gateway controller retaining call control data for the terminals under the control of the exchange, and
the call control data slave table is provided on another terminal interface and retains a copy of a portion of said call control data master table;
each of said terminal interfaces performs
a step of converting a call control protocol applied within the system of said multimedia gateway controller into a call control protocol for communication with a terminal connecting to said LAN and under the control of the exchange, and vice versa, for call procedures between said multimedia gateway controller and the terminal connecting to said LAN and under the control of the exchange; a step of transferring a call control protocol between said multimedia gateway controller and a plurality of terminals under the control of the exchange; a step of performing fault supervision, processing, and retransmission; a step of supervising the terminals under the control of the exchange; and a step of setting individually an upper limit to the number of terminals that can be controlled by each of said terminal interfaces.

7. A method for redundantly configuring terminal interfaces, as claimed in claim 6, further comprising:
a step of including, in said call control data, phone numbers, Internet Protocol addresses, and port numbers of the terminals under the control of the exchange.

8. A method for redundantly configuring terminal interfaces, as claimed in claim 6, further comprising:
a step of selecting a plurality of terminal interfaces to provide additional back up capacity of a terminal interface in which failure has occurred, when the number of terminals, previously controlled by the failed terminal interface, exceeds an upper limit to the number of terminals, set for a back up terminal interface configured to normally back up the failed terminal interface; and
a step of sharing the call control data as to the terminals under the control of the failed terminal interface between or among the plurality of selected terminal interfaces, and copying the shared portion of the call control data to said call control data slave tables on the plurality of selected terminal interfaces.

9. A method for redundantly configuring terminal interfaces, as claimed in claim 7, further comprising:
a step of selecting a plurality of terminal interfaces to provide additional back up capacity of a terminal interface in which failure has occurred, when the number of terminals, previously controlled by the failed terminal interface, exceeds an upper limit to the number of terminals, set for a back up terminal interface configured to normally back up the failed terminal interface; and a step of sharing the call control data as to the terminals under the control of the failed terminal interface between or among the plurality of selected terminal interfaces, and copying the shared portion of the call control data to said call control data slave tables on the plurality of selected terminal interfaces.

10. A method for redundantly configuring terminal interfaces, as claimed in claim 6, further comprising: a step of selecting a plurality of terminal interfaces to provide additional back up capacity of a terminal interface in which failure has occurred, when the number of terminals, previously controlled by the failed terminal interface, exceeds said upper limit to the number of terminals, set for a back up terminal interface configured to normally back up the failed terminal interface; and a step of sharing the call control data as to the terminals under the control of the failed terminal interface between or among the plurality of selected terminal interfaces, and copying the shared portion of the call control data to said call control data slave tables on the plurality of selected terminal interfaces.

11. A computer readable non-transitory tangible medium having computer readable code embodied therein for redundantly configuring terminal interfaces of an Internet Protocol compliant private branch electronic exchange which conducts switching control of terminals, the terminals including, at least, Internet Protocol compliant phones which may connect to the Internet, an intranet, or a Local Area Network (LAN), and an Internet Protocol terminal adapter which accommodates terminals not compliant with Internet Protocol and attaches Internet Protocol to the terminals, the computer readable code configured to cause a computer to perform:

upon, among a plurality of terminal interfaces connected to a bus of a multimedia gateway controller which performs call-control-processing tasks, any terminal interface failing to perform procedures for call control for a controlled terminal, a step of copying the call control data for the terminals controlled by the failed terminal interface from a call control data master table to a call control data slave table, wherein, the call control data master table is provided on said multimedia gateway controller and retains call control data for the terminals under the control of the exchange, and the call control data slave table is provided on another terminal interface and retains a copy of a portion of said call control data master table;

each of said terminal interfaces performs a step of converting a call control protocol applied within the system of said multimedia gateway controller into a call control protocol for communication with a terminal connecting to said LAN and under the control of the exchange, and vice versa, for call procedures between said multimedia gateway controller and the terminal connecting to said LAN and under the control of the exchange; a step of transferring a call control protocol between said multimedia gateway controller and a plurality of terminals under the control of the exchange; a step of performing fault supervision, processing, and retransmission; a step of supervising the terminals under the control of the exchange; and a step of setting individually an upper limit to the number of terminals that can be controlled by each of said terminal interfaces.

* * * * *